United States Patent Office 3,479,339
Patented Nov. 18, 1969

3,479,339
6-(α-3 - ACYLUREIDOPHENYLACETAMIDO)- AND 6-(α - 3 - ACYLUREIDOTHIENYLACETAMIDO)-PENICILLANIC ACIDS
Charles Truman Holdrege, Camillus, N.Y., assignor to Bristol-Myers Company, New York, N.Y., a corporation of Delaware
No Drawing. Filed June 13, 1968, Ser. No. 736,608
Int. Cl. C07d 99/16; A61k 21/00
U.S. Cl. 260—239.1                    34 Claims

ABSTRACT OF THE DISCLOSURE

6 - (α-3-acylureidophenylacetamido)- and 6-(α-3-acylureidothienylacetamido)-penicillanic acids are valuable as antibacterial agents, nutritional supplements in animal feeds, therapeutic agents in poultry and animals, including man, and are especially useful in the treatment of infectious diseases caused by Gram-positive and Gram-negative bacteria, most particularly those caused by the Pseudomonas genus. 6-{D-α-[3-(2'-furoyl)ureido]-3-thienylacetamido}-penicillanic acid, a preferred embodiment of the invention, is prepared by the treatment of 6-(D-α-amino-3-thienylacetamido)-penicillanic acid with 2-furoyl isocyanate.

BACKGROUND OF THE INVENTION

Field of the invention

The penicillins of the present invention possess the usual attributes of such compounds and are particularly useful in the treatment of Pseudomonas infections.

Description of the prior art

Heretofore very few penicillins have been found to possess any significant activity against Pseudomonas. The compounds of the present invention exhibit this desirable activity at significantly low concentrations.

α-Aminobenzylpenicillins and α-aminothenylpenicillins are known, as from U.S. Patents 2,985,648, 3,140,282, 3,373,156, 3,308,023 and 3,342,677 and British Patents 903,785, 918,169, 978,178, 991,586 and 1,033,257 and for such compounds bearing substituents on the α-amino group from such British patents as 891,777, 894,457, 1,053,818, 1,051,675, 1,048,907, 1,064,893, 1,066,107 and 1,080,247 and from South Africa 67/2,092. N-substituted 6-ureidopenicillanic acids have been disclosed, for example, in U.S. Patents 3,118,877, 3,120,512 and 3,180,863 and in Belgian Patent 603,703 and German Patent 1,120,072; 6-ureidopenicillanic acid itself is disclosed in German Patents 1,141,640 and 1,120,072 and French Patent 1,324,918. A few substituted α-ureidomethylpenicillins are disclosed in U.S. Patent 3,352,851 and British Patent 1,040,166; none have a substituent in the 3-position of the ureido group. British Patent 1,061,335 discloses 6-(D-α-hydrazinocarbonylamino - α - phenylacetamido) penicillanic acid and 6-(D-α-benzyloxycarbonylhydrazocarbonylamino-α-phenylacetamido)penicillanic acid and, in general, other so-called acyl groups in place of the benzyloxycarbonyl group.

SUMMARY OF THE INVENTION

Compounds having the formula

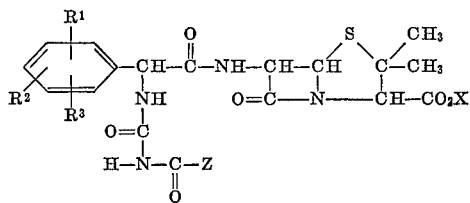

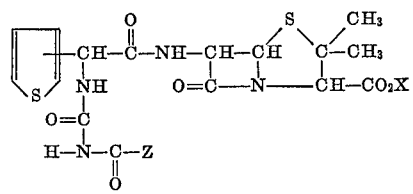

wherein $R^1$, $R^2$ and $R^3$ each is hydrogen, nitro, (lower) alkylamino, di(lower)alkylamino, (lower)alkanoylamino, amino, hydroxy, (lower)alkanoyloxy, (lower)alkyl (comprising straight and branched chain saturated aliphatic groups having from 1 to 6 carbon atoms inclusive), (lower)alkoxy, sulfamyl, chloro, iodo, bromo., fluoro or trifluoromethyl; Z is (lower)alkyl, cycloalkyl having 4, 5, 6 or 7 carbon atoms, monohalo(lower)alkyl, dichloromethyl, trichloromethyl, (lower)alkenyl of 2 to 6 carbon atoms,

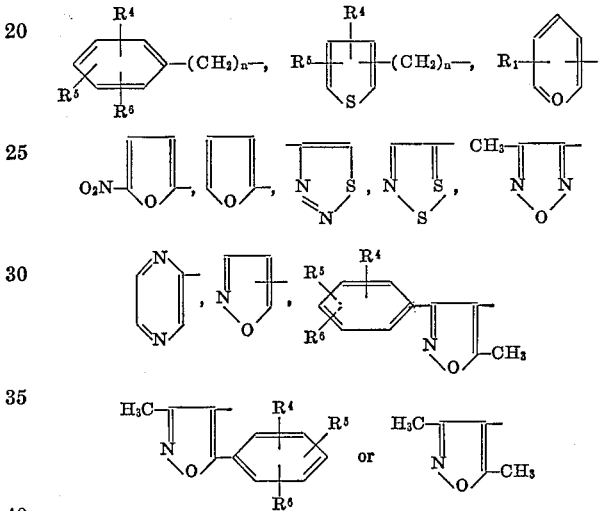

wherein $n$ is an integer from 0 to 3 inclusive and $R^4$, $R^5$ and $R^6$ each is hydrogen, nitro, di(lower)alkylamino, (lower)alkanoylamino, (lower)alkanoyloxy, (lower)alkyl (comprising straight and branched chain saturated aliphatic groups having from 1 to 6 carbon atoms inclusive), (lower)alkoxy, sulfamyl, chloro, iodo, bromo, fluoro or trifluoromethyl; X is hydrogen or a nontoxic, pharmaceutically acceptable metallic cation such as sodium, potassium, calcium, aluminum, and the like, the ammonium cation and substituted ammonium cations, e.g., cations of such nontoxic amines at tri(lower)alkylamines, i.e., triethylamine, etc., procaine, dibenzylamine, N-benzyl-beta-phenethylamine, 1-ephenamine, N,N'-dibenzylethylenediamine, dehydroabietylamine, N,N'-bis-dehydroabietylethylenediamine, N - (lower)alkylpiperidine, e.g., N-ethylpiperidine, or other such amines which have been used to form pharmaceutically acceptable nontoxic salts with benzyl-penicillin, are prepared by the treatment of the corresponding α-amino compound with an acyl isocyanate.

In a preferred embodiment of the invention, $R^1$, $R^2$, $R^3$ and, if present, $R^4$, $R^5$ and $R^6$ are each hydrogen, Z is one of the specified aromatic radicals and most preferably Z is phenyl, 2- or 3-thienyl, 2-furyl or 5-nitro-2-furyl and the α-carbon of the penicillin side chain (to which the acylureido group is attached) is of the D(—) configuration.

DETAILED DESCRIPTION

Antibacterial agents such as ampicillin (U.S. 2,985,648) have proved highly effective in the past in the therapy of infections due to Gram-positive and Gram-negative bacteria but these compounds have been notably lacking in their ability to effectively control Pseudomonas infections. Carbenicillin (U.S. 3,142,673 and 3,282,926) is active against Pseudomonas only in high concentrations and is useful in such infections in man only when given by injection.

It was an object of the present invention to provide compounds useful in the treatment of infections caused by Gram-positive and Gram-negative bacteria, including particularly those caused by *Pseudomonas aeruginosa*.

The compounds of the present invention as defined above under "Summary of the Invention" are particularly useful in that they possess antibacterial activity both Gram-positive and Gram-negative bacteria, and most particularly exhibit activity against *Pseudomonas aeruginosa* infections.

The α-carbon atom of the penicillin side chain (to which the acylureido group is attached) is an asymmetric carbon atom and the compounds of this invention can therefore exist in two optically active isomeric forms [the D- and L-diasterioisomers], as well as in the DL form which is a mixture of the two optically active forms; all such isomeric forms of the compounds are included within the scope of the present invention but the D(−) form is preferred. Also included within the scope of the present invention are easily hydrolyzed esters which are converted to the free acid form by chemical or enzymatic hydrolysis.

It should be noted in connection with the foregoing consideration of the diastereoisomers of this invention that many isomers other than the two caused by the asymmetric carbon of the side chain are possible due to the presence of asymmetric carbon atoms in the 6-aminopenicillanic acid nucleus. Such additional isomers, however, are not presently significant since 6-aminopenicillanic acid which is the product of fermentation processes is consistently of one configuration ; such 6-aminopenicillanic acid is presently used in the production of the compounds of this invention.

The compounds of the present invention are prepared by the process comprising the consecutive steps of (a) Mixing a compound having the formula

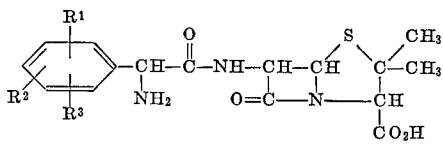

or

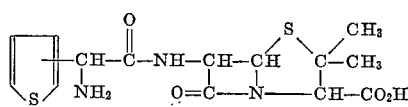

or a mono- or polyhydrate or salt thereof, wherein $R^1$, $R^2$ and $R^3$ each is hydrogen, nitro, di(lower)alkylamino, (lower)alkanoylamino, amino, hydroxy, (lower)alkanoyloxy, (lower)alkyl (comprising straight and branched chain saturated aliphatic groups having from 1 to 6 carbon atoms inclusive), (lower)alkoxy, sulfamyl, chloro, iodo, bromo, fluoro or trifluoromethyl; with an acyl isocyanate having the formula

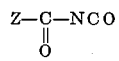

wherein Z is (lower)alkyl, cycloalkyl having 4, 5, 6 or 7 carbon atoms, monohalo(lower)alkyl, dichloromethyl, trichloromethyl, (lower) alkenyl of 2 to 6 carbon atoms,

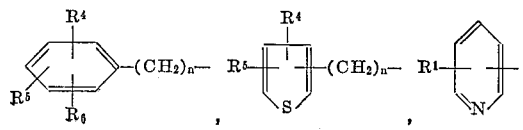

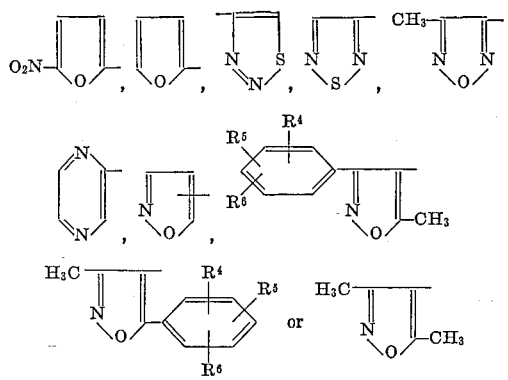

wherein $n$ is an integer from 0 to 3 inclusive and $R^4$, $R^5$ and $R^6$ each is hydrogen, nitro, di(lower)alkylamino, (lower)alkanoylamino, (lower)alkanoyloxy, (lower)alkyl (comprising straight and branched chain saturated aliphatic groups having from 1 to 6 carbon atoms inclusive), (lower)alkoxy, sulfamyl, chloro, iodo, bromo, fluoro or trifluoromethyl, preferably in a ratio of 1.0 to 1.5 equivalents of the acyl isocyanate per equivalent of the penicillin acid, in the presence of a base, preferably an organic base such as a pyridine, N-methylpiperidine, tri(lower)alkylamine, or the like, but preferably in the presence of pyridine or triethylamine, preferably in a ratio of one to two moles of amine per mole of the penicillin acid, in an anhydrous inert solvent such as dimethylformamide, dimethylsulfoxide, chloroform, tetrahydrofuran, n-pentane, methylene chloride, but preferably methylene chloride, at a temperature in the range of about −20° C. to 50° C., but preferably about 0° C. to 20° C., for a period of time of at least thirty minutes, with agitation to produce a compound having the formula

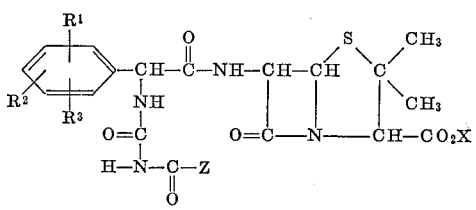

and

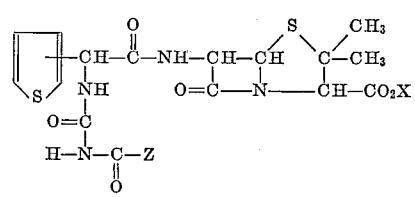

wherein $R^1$, $R^2$ and $R^3$ each is hydrogen, nitro, (lower)alkylamino, di(lower)alkylamino, (lower)alkanoylamino, amino, hydroxy, (lower)alkanoyloxy, (lower)alkyl (comprising straight and branched chain saturated aliphatic groups having from 1 to 6 carbon atoms inclusive), (lower)alkoxy, sulfamyl, chloro, iodo, bromo, fluoro or trifluoromethyl; Z is (lower)alkyl, cycloalkyl having 4, 5, 6 or 7 carbon atoms, monohalo(lower)alkyl, dichloromethyl, trichloromethyl, (lower)alkenyl of 2 to 6 carbon atoms,

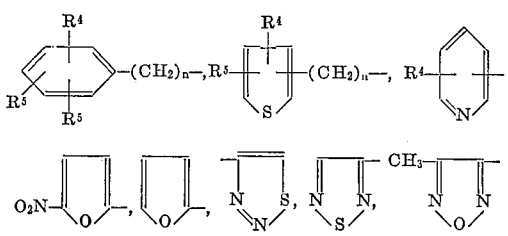

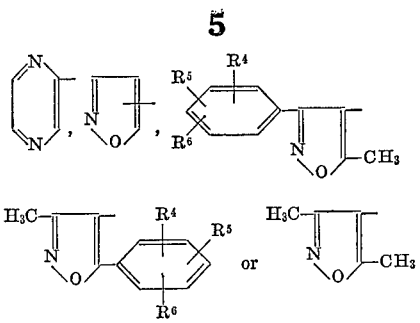

wherein *n* is an integer from 0 to 3 inclusive and $R^4$, $R^5$ and $R^6$ each is hydrogen, nitro, di(lower)alkylamino, (lower)alkanoylamino, (lower)alkanoyloxy, (lower)alkyl (comprising straight and branched chain saturated aliphatic groups having from 1 to 6 carbon atoms inclusive), (lower)alkoxy, sulfamyl, chloro, iodo, bromo, fluoro or trifluoromethyl; and their nontoxic, pharmaceutically acceptable salts.

The pulverized molecular sieves (Linde 4A) employed in the examples are added to make the system as anhydrous as possible. Care should be taken to remove them from the system prior to the addition of the acyl isocyanate. Although the products of the various examples are produced in the absence of the use of the molecular sieves, better yields appear to be obtained when they are used.

The α-aminopenicillanic acids used as starting materials in the present invention are made by various methods known to the art, the most preferred of which is embodied in U.S. Patent No. 3,140,282 which employs the condensation of an acid chloride hydrochloride with 6-aminopenicillanic acid to produce an α-aminoarylmethylpenicillin as illustrated below:

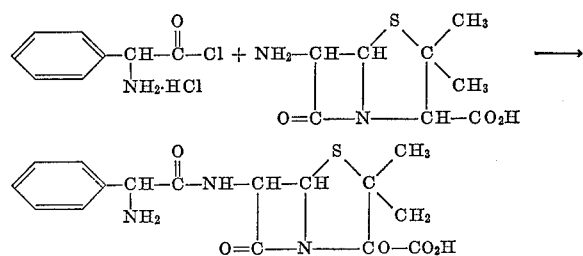

In the treatment of bacterial infections in man, the compounds of this invention are administered topically, orally and parenterially in accordance with conventional procedures for antibiotic administration in an amount of from about 5 to 125 mg./kg./day and preferably in the range of 15 to 50 mg./kg./day for Pseudomonas infections in divided dosages, e.g., three or four time a day. They are administered in dosage units containing, for example, 125, 250, 500, 1000 and 2000 mg. of active ingredient with suitable physiologically acceptable carriers or excipients. The dosage units can be in the form of liquid preparations such as solutions, dispersions, emulsions or in solid form such as tablets, capsules, etc.

The acyl isocyanates used as starting materials in the present invention are made by various methods known to the art, the most preferred of which is disclosed by Naito et al., The Journal of Antibiotics (Tokyo), Series A, 18, 145–157 (1965) and in U.S. Patent 3,180,863 and the references cited therein and by Speziale and Smith, J. Org. Chem., 27, 3742–3 (1962) and J. Org. Chem., 30, 4306–7 (1965) and comprises treatment with oxalyl chloride of the corresponding amide, e.g. benzamide yields benzoyl isocyanate. An alternative method comprises treatment of an acid chloride with silver cyanate according to Billeter, Ber., 36, 3213–3221 (1903) and Hill and Degnan, J. Am. Chem. Soc., 62, 1595–6 (1940) and Naito et al. (ibid). Another method comprises treatment of an acid chloride with cyanuric acid according to Styermark, J. Org. Chem., 28, 586 (1963).

Illustrative examples of the preparation of penicillins of the present invention follow. In the title of each example the moiety

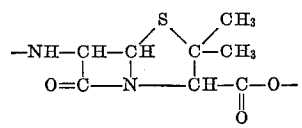

is represented simply by "—APA—".

These examples are given in illustration of, but not in limitation of, the present invention. All temperatures are in degrees centigrade. "Skellysolve B" is a petroleum ether fraction of B.P. 60–68° C. consisting essentially of n-hexane.

DESCRIPTION OF THE PREFERRED EMBODIMENTS.—EXAMPLE 1

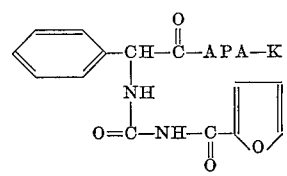

Potassium 6-{D - α - [3-(2-furoyl)ureido]phenylacetamido}penicillanate.—A mixture of 22.7 g. (0.056 mole) of ampicillin trihydrate, 11.8 ml. (0.084 mole) of triethylamine, 30 g. of powdered molecular sieves (Linde 4A), and 300 ml. of methylene chloride was stirred at room temperature for three hours. The molecular sieves were removed by filtration. 2-furoyl isocyanate [Naito et al., J. Antibiotics (Tokyo), Ser. A, 18(L), 145–157 (1965)] (8.5 g., 0.062 mole) was added and the mixture was stirred for one hour at room temperature. Addition of 300 ml. of water to the reaction mixture gave an emulsion. The methylene chloride was distilled off at reduced pressure. The aqueous residue was layered with ethyl acetate and acidified with 42% phosphoric acid. The phase was extracted twice more with ethyl acetate. The combined ethyl acetate extracts containing the penicillin free acid were washed three times with water and then extracted with a solution of 4.7 g. of sodium bicarbonate in 300 ml. of water. The bicarbonate extracts were washed three times with ethyl acetate (discarded), acidified with 42% phosphoric acid, and extracted three times with ethyl acetate. The combined ethyl acetate extracts were washed with water, dried with sodium sulfate, filtered, and treated with 21.5 ml. (0.056 mole) of potassium 2-ethylhexanoate in 1-butanol. After the product, potassium 6 - {D-α-[3-(2-furoyl)ureido]phenylacetamido}penicillanate, had crystallized it was collected by filtration, washed with ethyl acetate and sparingly with acetone, and dried. The product was suspended in 150–200 ml. of 95% ethanol and water was added dropwise until a solution was obtained. A small amount of insoluble material was removed by filtration. Dilution to the cloud point with ethyl acetate gave crystalline potassium 6-{D - α - [3-(2-furoyl)ureido]phenylacetamido}penicillanate. The filtered product was washed with ethyl acetate and sparingly with acetone, air dired, and then dried for three hours in a vacuum oven at 60°; yield 16.2 g., M.P. 192–195° dec.

The elemental analyses, infrared and N.M.R. spectra were consistent for the desired product as the trihydrate.

The minimum inhibitory concentration (M.I.C.) of this product in mcg./ml. versus a strain of *Pseudomonas aeruginosa* was determined by overnight incubation at 37° C. in nutrient broth by serial two-fold tube dilution and found to be 4 mcg./ml.; in the same experiment the M.I.C. for sodium ampicillin was found to be 125 mcg./ml.

The median curative dose ($CD_{50}$) in mgm./kg. against an overwhelmingly lethal challenge with *Pseudomonas aeruginosa* (strain A9843) was determined by intramuscular injection of this product in mice of the indicated dosage at the time of challenge and again 3, 6, 24, 27 and 30 hours later; thus a dose of 36 mgm./kg. given at each of these six times is reported as 36× 6. Deaths were counted for 72 hours after challenge. The $CD_{50}$ found for this product was 320× 6 mgm./kg.; the $CD_{50}$ for sodium ampicillin in the same experiment was >800× 6 mgm./kg.

EXAMPLE 2

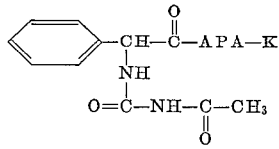

First Preparation

Potassium 6 - [D-α-(3-acetylureido)phenylacetamido]-penicillanate.—Ampicillan trihydrate (17.6 g., 0.0435 mole), 9.1 ml. (0.0652 mole) of triethylamine and 150 ml. of methylene chloride were combined and stirred during 15 minutes at room temperature during which time much of the ampicillan dissolved. Powdered molecular sieves (Linde 4A) (30 g.) were added and stirring continued for one hour longer at room temperature in an apparatus protected from atmospheric moisture. The mixture was filtered to remove molecular sieves with about 50 ml. additional methylene chloride being used to wash the filter cake.

To the thus obtained solution of ampicillin triethylammonium salt in methylene chloride was added 3.72 g. (0.0435 mole) of acetyl isocyanate (Ber., 36, 3216). The reaction mixture was stirred at room temperature for one hour in an apparatus protected from atmospheric moisture. The solution was extracted three times with water using a total volume of about 350 ml. The combined aqueous extracts were washed once with ethyl acetate. The aqueous phase was layered with ethyl acetate and acidified with 42% phosphoric acid. A total of three extractions using a volume of about 450 ml. of ethyl acetate were made. The combined ethyl acetate extracts containing the acid penicillin were washed twice with water, dried (anhydrous sodium sulfate), filtered, and concentrated to a volume of about 200 ml. on a rotary flash evaporator. The concentrate was treated with 14 ml. (0.04 mole) of a solution of potassium 2-ethylhexanoate in 1-butanol. After one hour the crystalline precipitate of potassium 6-[D-α-(3-acetylureido)phenylacetamido]-penicillanate was collected by filtration, washed with ethyl acetate and a small amount of acetone, and dried in vacuo over phosphorus pentoxide; wt. 1.77 g., M.P. 199–203 dec. with prior shrinking and darkening. The infrared and nuclear magnetic resonance spectra were consistent for the desired product.

Analysis.—Calcd. for $C_{19}H_{21}N_4O_6SK \cdot 2H_2O$: C, 44.87; H, 4.96; N, 11.02. Found: C, 44.89; H, 4.98; N, 10.62.

Second Preparation.—Potassium 6-[D-α-(3-acetylureido)-phenlacetamido]-penicillanate (A) Preparation of acetylisocyanate.—Acetyl chloride (60 g.) was added dropwise to a stirred suspension of 125 g. of dry silver cyanate in 250 ml. of dry n-pentane with cooling to maintain the temperature at 25 to 30°. The mixture was refluxed for one-half hour and then stirred at room temperature for another one-half hour. The organic phase was decanted from the solid residue and added dropwise to 50 g. of silver cyanate with good stirring; the mixture was allowed to reflux from the heat of reaction during the addition. After stirring for one hour at room temperature an infrared spectrum of the organic phase showed the presence of acetyl isocyanate plus some acetyl chloride. Therefore, an addition 20 g. of silver cyanate was added and the mixture stirred for one-half hour. The organic phase was decanted from the solid residue. An infrared spectrum showed the solution to contain approximately 3% acetyl isocyanate and no acetyl chloride; volume 200 ml.

(B) Reaction with ampicillin.—Triethylamine (10.5 ml., 0.075 mole) was added to a stirred suspension of 20.2 g. (0.05 mole) of ampicillin trihydrate in 600 ml. of methylene chloride. Powered molecular sieves (Linde 4A) (45 g.) were added and the mixture stirred for three hours at room temperature in an apparatus protected from atmospheric moisture. The molecular sieves were removed by filtration with an additional 100 ml. (approximately of methylene chloride being used to wash the filter cake. The above-prepared solution of acetyl isocyanate in n-pentane (200 ml., about 6 g., 0.0707 mole of acetyl isocyanate) was added to the thus obtained solution of ampicillin triethylammonium salt in methylene chloride. The solution was stirred for 3 hours at room temperature in an apparatus protected from atmospheric moisture. The reaction mixture was extracted five times with water. The combined aqueous extracts were washed three times with ethyl acetate. The aqueous phase was acidified with 42% phosphoric acid and extracted with a total of 800 ml. of ethyl acetate in three portions. The combined ethyl acetate extracts were washed three times with water, dried (anhydrous sodium sulfate), filtered, and treated with 18 ml. (0.05 mole) of potassium 2-ethylhexanoate in 1-butanol. An oil separated which crystallized on seeding. After one-half hour the mixture was concentrated slightly on the rotary flash evaporator and the product collected by filtration, washed with ethyl acetate and acetone, dried overnight in vacuo over phosphorus pentoxide and further dried for 2 hrs. in a vacuum oven at 60–65°; yield 22.5 g., M.P. 199–204° dec. with prior darkening. The infrared and nuclear magnetic resonance spectra were consistent with potassium 6-[D-α(3-acetylureido)phenylacetamido]penicillanate.

Analysis.—Calcd. for $C_{19}H_{21}N_4O_6SK \cdot H_2O$: C, 46.51; H, 4.72; N, 11.42. Found: C, 46.71; H, 4.66; N, 11.36.

The minimum inhibitory concentration (M.I.C.) of this product in mcg./ml. versus a strain of Pseudomonas aeruginosa was determined by overnight incubation at 37° C. in nutrient broth by serial two-fold tube dilution and found to be 8 mcg./ml.; in the same experiment the M.I.C. for sodium ampicillin was found to be 125 mcg./ml.

EXAMPLE 3

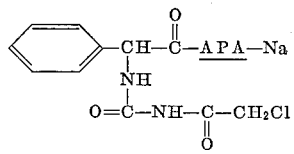

Sodium 6-[D - α - (3-chloroacetylureido)phenylacetamido]penicillanate.—Triethylamine (11.5 ml., 0.0744 mole) was added to a suspension of 20 g. (0.0496 mole) of ampicillin trihydrate in 175 ml. of methylene chloride. After stirring for 10 minutes (much of the ampicillin dissolved) 30 g. of powdered molecular sieves (Linde 4A) were added and the mixture stirred for three hours at room temperature. The molecular sieves were removed by filtration with an additional 30 ml. of methylene chloride being used to wash the filter cake.

To the thus obtained solution of ampicillin triethylammonium salt in methylene chloride was added 6.0 g. (0.050 mole of chloroacetyl isocyanate [Speziale, Smith, J. Org. Chem., 27, 3742 (1962)] and the solution was stirred for one hour at room temperature in an apparatus protected from atmospheric moisture. The reaction mixture was extracted three times with water. The combined aqueous extracts were washed once with ethyl acetate. The aqueous phase was acidified with 42% phosphoric acid and extracted three times with ethyl acetate. The combined ethyl acetate extracts containing the penicillin free acid were washed three times with water, dried (anhydrous sodium sulfate), filtered, concentrated to a volume of about 250 ml., and treated with 16.2 ml. (0.049 mole) of sodium 2-ethylhexanoate in 1-butanol giving a precipitate of sodium 6-[D - α - (3-chloroacetylureido)phenylacetamido]-penicillanate. The product was collected by filtration, washed with ethyl acetate and acetone and dried in vacuo over phosphorus pentoxide; yield 17.5 g. The infrared and nuclear magnetic resonance spectra were consistent with the desired product.

*Analysis.*—Calcd. for $C_{19}H_{20}ClN_4O_6SNa$: C, 46.48; H, 4.12; N, 11.42. Found: C, 46.31; H, 4.69; N, 10.52.

The minimum inhibitory concentration (M.I.C.) of this product in mcg./ml. versus a strain of *Pseudomonas aeruginosa* was determined by overnight incubation at 37° C. in nutrient broth by serial two-fold tube dilution and found to be .8 mcg./ml.; in the same experiment the M.I.C. for sodium ampicillin was found to be 125 mcg./ml.

The median curative dose ($CD_{50}$) in mgm./kg. against an overwhelmingly lethal challenge with *Pseudomonas aeruginosa* (strain A9843) was determined by intramuscular injection of this product in mice of the indicated dosage at the time of challenge and again 3, 6, 24, 27 and 30 hours later; thus a dose of 36 mgm./kg. given at each of these six times is reported as 36× 6. Deaths were counted for 72 hours after challenge. The $CD_{50}$ found for this product was 640× 6 mgm./kg.; the $CD_{50}$ for sodium ampicillin in the same experiment was 1400× 6 mgm./kg.

EXAMPLE 4

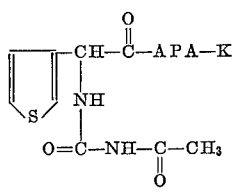

Potassium 6 - [D - α - (3-acetylureido)-3-thienylacetamido]penicillanate.—6 - (D-α-amino-3-thienylacetamido)penicillanic acid trihydrate (10 g., 0.0244 mole), 5.1 ml. (0.0366) of triethylamine, 25 g. of powdered molecular sieves (Linde 4A) and 300 ml. of methylene chloride were combined and stirred at room temperature for 3 hrs. The molecular sieves were removed by filtration an additional 50 ml. of methylene chloride being used to wash the filter cake. To the filtrate was added 130 ml. of approximately a 3% solution of acetyl isocyanate in n-pentane. The solution was stirred for 1.5 hours at room temperature and then extracted four times with water. The combined aqueous extracts were washed three times with ethyl acetate, acidified with 42% phosphoric acid, and extracted with 3 portions of ethyl acetate. The combined ethyl acetate extracts containing the penicillin free acid were washed three times with water, dried with sodium sulfate, filtered, concentrated slightly, and treated with 8.9 ml. (0.0244 mole) of potassium 2-ethylhexanoate in 1-butanol giving an oil which crystallized. The product was collected by filtration and washed with ethyl acetate and acetone; yield 10.3 g., M.P. 198–203° dec. with prior darkening. The infrared and nuclear magnetic resonance spectra were consistent with potassium 6-[D-α-(3-acetylureido)-3-thienylacetamido]penicillinate.

*Analysis.*—Calcd. for $C_{17}H_{19}N_4O_6S_2K \cdot 2H_2O$: C, 39.67; H, 4.50; N, 10.89. Found: C, 39.94; H, 4.97; N, 10.61.

The minimum inhibitory concentration (M.I.C.) of this product in mcg./ml. versus a strain of *Pseudomonas aeruginsoa* was determined by overnight incubation at 37° C. in nutrient broth by serial two-fold tube dilution and found to be 16 mcg./ml.; in the same experiment the M.I.C. for sodium ampicillin was found to be 125 mcg./ml.

EXAMPLE 5

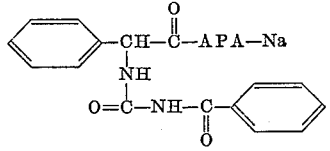

Sodium 6 - [D-α-(3-benzoylureido)phenylacetamido]-penicillanate.—A mixture of 22.7 g. (0.056 mole) of ampicillin trihydrate, 11.8 ml. (0.084 mole) of triethylamine, 30 g. of powdered molecular sieves (Linde 4A), and 190 ml. of methylene chloride was stirred at room temperature for three hours. The molecular sieves were removed by filtration. Benzoyl isocyanate [Speziale, Smith, J. Org. Chem., 27, 3742 (1962)] (9.1 g., 0.062 mole) was added all at once and the solution stirred at room temperature for one hour in an apparatus protected from atmospheric moisture. Attempted extraction of the reaction mixture with water caused the mixture to form a thick gelatinous emulsion. The mass was acidified with 42% phosphoric acid and the methylene chloride stripped off at reduced pressure. Ethyl acetate was added to the aqueous mixture to dissolve the solid material. The aqueous phase was extracted twice more with ethyl acetate, some insoluble material being removed by filtration. The combined ethyl acetate extracts containing the penicillin free acid were washed twice with water and then extracted four times with aqueous sodium bicarbonate containing 30% excess of sodium bicarbonate over the theoretical amount. The combined aqueous sodium bicarbonate extracts were washed with ethyl acetate, then layered with ethyl acetate and acidified with 42% phosphoric acid. The product was extracted three times with ethyl acetate (total ca. 400 ml.). The combined ethyl acetate extracts containing the penicillin free acid were washed three times with water, dried with sodium sulfate, filtered, and treated with 18.5 ml. (0.056 mole) of sodium 2-ethylhexanoate in 1-butanol. The crystalline product obtained by scratching and trituration of the resulting oil with fresh solvent was filtered, washed with ethyl acetate, acetone, and ether, and dried in vacuo over phosphorus pentoxide; yield 20.2 g., M.P. 195–197° dec. with prior darkening. The infrared and nuclear magnetic resonance spectra were consistent with sodium 6-[D-α-(3-benzoylureido)phenylacetamido]penicillinate.

*Analysis.*—Calcd. for $C_{24}H_{23}N_4O_6SNa \cdot H_2O$: C, 53.72; H, 4.70; N, 10.44. Found: C, 54.06; H, 4.77; N, 9.87.

The minimum inhibitory concentration (M.I.C.) of this product in mcg./ml. versus a strain of *Pseudomonas aeruginosa* was determined by overnight incubation at 37° C. in nutrient broth by serial two-fold tube dilution and found to be 4 mcg./ml.; in the same experiment the M.I.C. for sodium ampicillin was found to be 125 mcg./ml.

The median curative dose ($CD_{50}$) in mgm./kg. against an overwhelmingly lethal challenge with *Pseudomonas aeruginosa* (strain A9843) was determined by intramuscular injection of this product in mice of the indicated dosage at the time of challenge and again 3, 6, 24, 27 and 30 hours later; thus a dose of 36 mgm./kg. given at each of these six times is reported as 36× 6. Deaths were counted for 72 hours after challenge. The $CD_{50}$ found for this product was 460× 6 mgm./kg.; the $CD_{50}$ for sodium ampicillin in the same experiment was 1400× 6 mgm./kg.

EXAMPLE 6

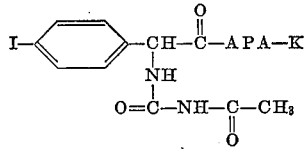

D-α-acetamido-phenylacetic acid.—A suspension of 50 g. (0.331 mole) of D-(—)-2-phenylglycine in 700 ml. of water was cooled to 0 to 5° C. and 13.2 g. (0.331 mole) of sodium hydroxide was added with stirring to produce a solution. Acetic anhydride (67.5 g., 0.662 mole) was added rapidly in one portion to the vigorously stirred solution which was initially cooled to 0 to 5° C. by means of a salt-ice cooling bath. This was immediately followed by the addition of a solution of 39.7 g. (0.993 mole) of sodium hydroxide in 200 ml. of water in a rapid stream from a dropping funnel. The temperature rose to a maximum of about 25° C. The solution was stirred for an additional fifteen minutes in the cooling bath and then acidified with concentrated hydrochloride acid. The precipitated product was collected by filtration, washed on the filter with water and recrystallized from 1:1 95% ethanol-water; yield 46.0 g. (72%), M.P. 186–188° C., $[\alpha]_D^{24°} = -217.9°$ (C. 1%—EtOH).

D-α-acetamido-4-nitrophenylacetic acid.—D-α - acetamidophenylacetic acid (20 g., 0.104 mole) was slowly added to 50 ml. of concentrated sulfuric acid with cooling as needed to maintain the temperature at 20 to 25° C. The mixture was stirred for about 20 minutes until most of the solid dissolved. Nitric acid (90%, $d = 1.5$, 9.7 ml. 0.208 mole) was added dropwise at such a rate to the stirred mixture that the salt-ice cooling bath maintained the temperature in the range 0 to —5° C. The reaction mixture was stirred at —5 to —10° C. for an additional 30 minutes and then poured onto about 300 g. of ice flakes. The white crystalline product was collected by filtration, washed with water and recrystallized three times from 1:1 95% ethanol-water; M.P. 180–182° C. dec., yield 11.5 g. (46.4%). An additional recrystallization from ethyl acetate did not change the melting point; $[\alpha]_D^{24°} = -206.4°$ (C. 5%—EtOH).

Analysis.—Calcd. for $C_{10}H_{10}N_2O_5$: C, 50.42; H, 4.23; N, 11.76. Found: C, 50.14; H, 4.07; N, 11.96.

D-α-acetamido-4-aminophenylacetic acid.—A solution of 15 g. (0.063 mole) of D-α-acetamido-4-nitrophenylacetic acid in 250 ml. of 95% ethanol was hydrogenated in the presence of 0.6 g. of 5% palladium on carbon on a Paar hydrogenator at an initial pressure of 50 p.s.i. for 64 minutes. The product had crystallized from the hydrogenation mixture. Approximately 200 ml. of water was added, the mixture warmed to dissolve the product and the catalyst removed by filtration. Chilling the filtrate gave 9.9 g. of product, M.P. 192–195° C. dec. The product was recrystallized four times from 1:1 95% ethanol-water, weight 4.8 g., M.P. 207–209° C. dec., $$[\alpha]_D^{24°} = -182.2°$$

(C. 0.5%—1 N HCl).

Analysis.—Calcd. for $C_{10}H_{12}N_2O_3$: C, 57.71; H, 5.81; N, 13.46. Found: C, 57.61, 57.64; H, 5.67; N, 13.18.

D-α-acetamido-4-iodophenylacetic acid.—To a solution of 5.0 g. (0.024 mole) of D-α-acetamido-4-aminophenylacetic acid in 70 ml. of trifluoroacetic acid at —5 to 0° was added slowly 1.8 g. of sodium nitrite. The solution was stirred for 25 minutes. Solid potassium iodide (4.8 g., 0.024 mole) was added at 0 to 5°. The temperature of the dark brown mixture was increased to 30° whereupon a vigorous gas evolution occurred. The mixture was maintained at 30° for 45 minutes and then heated at reflux for one-half hour. The trifluoroacetic acid phase was decanted from the dark colored insoluble material. The trifluoroacetic acid was distilled off at reduced pressure. The residue was taken up in 50 ml. of water. After ice cooling there was obtained a precipitate of brown solid. Two recrystallizations from 1:1 95% ethanol-water gave D-α-acetamido-4-iodophenyl-acetic acid; M.P. 217° dec. with darkening at 202°, $[\alpha]_D^{24°} = -173.2°$ (C. 0.5 95% ethanol).

Analysis.—Calcd. for $C_{10}H_{10}INO_3$: C, 37.64; H, 3.16; N, 4.39. Found: C, 37.84; H, 3.30; N, 4.34.

The dark colored insoluble material was slurried with water and treated with 1 M sodium thiosulfate to remove the iodine color. The solid was filtered, washed with water and twice recrystallized from 1:1 95% ethanol-water with a carbon treatment giving additional product:

$$[\alpha]_D^{24°} = -170.6°$$

(C. 0.5 95% ethanol).

Analysis.—Calcd. for $C_{10}H_{10}INO_3$: C, 37.64; H, 3.16; N, 4.39. Found: C, 37.70; H, 3.25; N, 4.45.

D-α-amino-4-iodophenylacetic acid.—A suspension of 3.7 g. (0.011 mole) of D-α-acetamido-4-iodophenylacetic acid in 15 ml. of 2 N hydrochloric acid plus sufficient dioxane to give a solution at the boiling point was heated at reflux for 1.5 hours. The solvent was distilled off at reduced pressure. The residue was extracted with water, the insoluble material (solid A) being removed by filtration. The filtrate was stripped to dryness at reduced pressure and the solid residue was extracted with water, the insoluble material (solid B) again removed. The filtrate was again evaporated to dryness and the residue extracted with water and the insoluble material (solid C) again removed. The filtrate was stripped to dryness giving solid D as residue. The infrared spectra (KBr) showed solids A and B to be amino acid zwitter ion and solid C to be mostly amino acid hydrochloride.

Solid A was hydrolyzed in 2.5 N hydrochloric acid plus diozane for 1.75 hours. The solution was evaporated to dryness, the residue taken up in water, a small amount of insoluble material removed by filtration, and the filtrate evaporated to dryness leaving solid E. An infrared spectrum (KBr) showed solid E to be a mixture of amino acid hydrochloride and zwitter ion.

Solids D and E were combined in water and the system adjusted to pH 4.5 giving 1.55 g. of D-α-amino-4-iodophenylacetic acid; M.P. 204–205° dec., $[\alpha]_D^{24°} = -99.4°$ (C. 0.5 1 N HCl).

Analysis.—Calcd. for $C_8H_8INO_2$: C, 34.68; H, 2.91; N, 5.06. Found: C, 34.63; H, 3.24; N, 4.77.

D-α-amino-4-iodophenylacetic acid.—D-α - acetamidophenylacetic acid (Beil., 14, 591) (200 g., 1.036 mole) was added slowly to a solution of 161.6 g. (0.52 mole) of silver sulfate in 1.2 l. of conc. sulfuric acid with cooling as needed to keep the temperature below 30°. Finely pulverized iodine (684 g., 2.7 mole) was added in portions during 1.5 hours. The mixture was stirred at room temperature for 1.5 hours longer. The mixture was filtered through a sintered glass filtered and the filtrate poured into ca. 3 l. of crushed ice. The solid was filtered, washed with water, and air dried. The material was recrystallized from 650 ml. of 2-propanol (the hot solution was filtered to remove some insoluble material) giving solid A; yield 46.6 g., M.P. 175–183° dec. The filtrate was concentrated and stored in the cold overnight giving solid B; yield 132 g., M.P. 160–168°. Solids A and B were crude D-α-acetamido-4-iodophenylacetic acid.

Solid B was combined with 500 ml. of 2 N hydrochloric acid and refluxed for one hour. The insoluble material (solid C) was removed by filtration and washed with water; yield 100 g., M.P. 180–183°.

Solid C was hydrolyzed in 200 ml. of 2 N hydrochloric acid plus enough dioxane to solubilize the material. After 2.25 hours at reflux the solvent was distilled off at reduced pressure and the residue extracted with 250 ml. of water. The insoluble material (solid D) was removed by filtration. The filtrate was adjusted to pH 4.5 and after cooling in an ice bath the precipitate was filtered, washed with water, and triturated with boiling 95% ethanol giving 10.8 g. of D-α-amino-4-iodophenylacetic acid.

Solid A was hydrolyzed in 2 N hydrochloric acid plus dioxane for two hours and the solvent distilled off at reduced pressure. The residue was extracted with water. The insoluble material (solid F) was removed by filtration. The filtrate was adjusted to pH 4.5 giving crystalline D -α - amino - 4 - iodophenylacetic acid; yield 14.4 g., $[\alpha]_D^{24°} = -86.2°$ (C. 0.5 1 N HCl).

Solids D and F were combined and suspended in 350 ml. of water. The suspension was adjusted to pH 4.5 with 20% sodium hydroxide. The solid was filtered, washed with water, air dried, and triturated with 300 ml. of boiling 95% ethanol giving 42.5 g. of D-α-amino-4-iodophenylacetic acid; $[α]_D^{24°} = -99.8°$ (C. 0.5 1 N HCl).

D - α - amino - 4 - iodophenylacetyl chloride hydrochloride.—A suspension of 42.3 g. (0.15 mole) of finely ground D-α-amino-4-iodophenylacetic acid in 1.5 l. of methylene chloride was gassed at 0 to 5° with anhydrous hydrogen chloride and 40.6 g. (0.195 mole) of phosphorus pentachloride added. The mixture was stirred for two hours at 5°. Skellysolve B (800 ml.) was added to the reaction mixture and the product collected by filtration. The product was washed with Skellysolve B and dried in vacuo; yield 40.9 g. (82%).

6 - (D - α - amino-4-iodophenylacetamido)penicillanic acid.—A suspension of 26.5 g. (0.123 mole) of 6-aminopenicillanic acid in 300 ml. of water at 5° was brought into solution by adjusting to pH 7.0–7.2 with 10% sodium hydroxide. Acetone (1360 ml.), which had been cooled to 0 to 5°, was added and the solution adjusted to pH 2.5–3.3 with 6 N hydrochloric acid. D-α-amino-4-iodophenylacetyl chloride hydrochloride (40.9 g., 0.123 mole) was added gradually at 0 to 5° while 10% sodium hydroxide was added as needed to maintain the mixture at pH 2.0–2.8. After the addition was complete the mixture was adjusted to pH 2.9 and stirred for five minutes. After adding 3.6 l. of methyl isobutyl ketone (MIBK) the aqueous phase was separated and the MIBK phase extracted with 360 ml. of water. The aqueous phases were combined and adjusted to pH 4.5 with 10% sodium hydroxide causing the product to crystallize. The product was collected by filtration (filtrate retained) and washed with water and acetone (crop A); yield 14.4 g., M.P. 191–195° dec. The combined aqueous and acetone washings from crop A were concentrated to remove acetone giving crop B; 4.0 g., M.P. 191–195° dec. The aqueous filtrate from crop A was concentrated giving crop C; 11.7 g., M.P. 191–195° dec. The infrared and nuclear magnetic resonance spectra for the three crops were consistent with 6-(D-α-amino-4-iodophenylacetamido) penicillanic acid.

Analysis.—Calcd. for $C_{16}H_{18}IN_3O_4S \cdot 3H_2O$: C, 36.30; H, 4.57; N, 7.94. Found: C, 36.88; H, 4.19; N, 7.09.

Potassium 6-[D-α-(3-acetylureido)-4-iodophenylacetamido]penicillanate (A) Preparation of acetyl isocyanate.—Acetyl chloride (40 g.) was added dropwise to a stirred suspension of 125 g. of dry silver cyanate in 260 ml. of n-pentane at 5 to 10°. After stirring for 20 minutes the solid was removed by filtration. The filtrate was added slowly to 40 g. of fresh silver cyanate at 5 to 10°. After 20 minutes the solids were removed by filtration and the filtrate was added slowly to an additional 40 g. of silver cyanate at 5 to 10°. After 45 minutes at 5 to 10° another 20 g. of silver cyanate was added. The mixture was stirred at 5 to 10° for an additional 45 minutes. The organic phase was decanted through a filter giving 250 ml. of an approximately 6% solution (by infrared assay) of acetyl isocyanate in n-pentane.

(B) Reaction with 6 - (D - α - amino - 4 - iodophenylacetamido)penicillanic acid.—Six g. of 6-(D-α-amino-4-iodophenylacetamido)penicillanic acid, 3 ml. of triethylamine, 14 g. of powdered molecular sieves (Linde 4A), and 160 ml. of methylene chloride were combined and stirred for three hours at room temperature in an apparatus protected from atmospheric moisture. The molecular sieves were removed by filtration, an additional 50 ml. of methylene chloride being used to wash the filter cake. Acetyl isocyanate (30 ml. of a 6% solution in n-pentane) was added to the filtrate and the solution stirred at room temperature for 1.5 hours. The reaction mixture was extracted five times with water. The combined aqueous extracts were washed twice with ethyl acetate. The aqueous phase was acidified with 42% phosphoric acid and extracted 3 times with ethyl acetate. The combined ethyl acetate extracts were washed with water, dried with sodium sulfate, filtered, concentrated slightly and treated with 4.6 ml. (0.0126 m.) of potassium 2-ethylhexanoate in 1-butanol giving an oil which crystallized. The volume was reduced further removing most of the water. The crystalline potassium 6-[D-α-(3-acetylureido)-4-iodophenylacetamido]penicillanate was filtered and washed with ethyl acetate, sparingly with acetone, and anhydrous ether. The product was dried in vacuo over phosphorus pentoxide and then for one hour in vacuo at 65°; yield 1.5 g., M.P. 205–209° dec. with prior darkening. The infrared and nuclear magnetic resonance spectra were consistent with the desired product.

Analysis.—Calcd. for $C_{19}H_{20}IN_4O_6SK \cdot H_2O$: C, 37.02; H, 3.60; N, 9.09. Found: C, 36.93; H, 3.90; N, 9.10.

The minimum inhibitory concentration (M.I.C.) of this product in mcg./ml. versus a strain of Pseudomonas aeruginosa was determined by overnight incubation at 37° C. in nutrient broth by serial two-fold tube dilution and found to be 4 mcg./ml.; in the same experiment the M.I.C. for sodium ampicillin was found to be 125 mcg./ml.

The median curative dose ($CD_{50}$) in mgm./kg. against an overwhelming lethal challenge with Pseudomonas aeruginosa (strain A9843) was determined by intramuscular injection of this product in mice of the indicated dosage at the time of challenge and again 3, 6, 24, 27 and 30 hours later; thus a dose of 36 mgm./kg. given at each of these six times is reported as 36× 6. Deaths were counted for 72 hours after challenge. The $CD_{50}$ found for this product was 210× 6 mgm./kg.; the $CD_{50}$ for sodium ampicillin in the same experiment was 845× 6 mgm./kg.

EXAMPLE 7

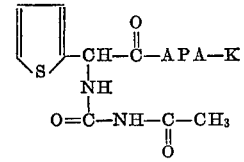

Potassium 6 - [D - α - (3 - acetylureido) - 2 - trienylacetamido]-penicillanate.—A mixture of 12.1 g. (0.029 mole) of 6-(D-α-amino-2-thienylacetamido)penicillanic acid trihydrate, 6.2 ml. (0.043 mole) of triethylamine, 30 g. of powdered molecular sieves (Linde 4A), and 360 ml. of methylene chloride was stirred at room temperature for three hours. The molecular sieves were removed by filtration. There was added 82 ml. of an approximately 6% solution of acetyl isocyanate in n-pentane and the solution stirred at room temperature for one hour. The reaction mixture was extracted four times with water. The combined aqueous extracts were washed three times with ethyl acetate, acidified with 42% phosphoric acid, and extracted three times with ethyl acetate. The combined ethyl acetate extracts containing the penicillin free acid were washed three times with water, dried with sodium sulfate, filtered, and treated with 10.5 ml. (0.029 mole) of potassium 2-ethylhexanoate in 1-butanol. The volume was concentrated slightly causing the product to crystallize. The product was filtered, washed with ethyl acetate and sparingly with acetone, and dried in vacuo over phosphorus pentoxide; yield 14.4 g., M.P. 187–190° dec. The infrared and nuclear magnetic spectra were consistent with potassium 6-[D-α-(3-acetylureido)-2-thienylacetamido]penicillanate.

Analysis.—Calcd. for $C_{17}H_{19}N_4O_6S_2K \cdot H_2O$: C, 41.11; H, 4.26. Found: C, 41.47; H, 4.16.

The minimum inhibitory concentration (M.I.C.) of this product in mcg./ml. versus a strain of Pseudomonas aeruginosa was determined by overnight incubation at 37° C. in nutrient broth by serial two-fold tube dilution and found to be 8 mcg./ml.; in the same experiment the M.I.C. for sodium ampicillin was found to be 125 mcg./ml.

The median curative dose (CD$_{50}$) in mgm./kg. against an overwhelmingly lethal challenge with *Pseudomonas aeruginosa* (strain A9843) was determined by intramuscular injection of this product in mice of the indicated dosage at the time of challenge and again 3, 6, 24, 27 and 30 hours later; thus a dose of 36 mgm./kg. given at each of these six times is reported as 36× 6. Deaths were counted for 72 hours after challenge. The CD$_{50}$ found for this product was 700× 6 mgm./kg.; the CD$_{50}$ for sodium ampicillin in the same experiment was 845× 6 mgm./kg.

EXAMPLE 8

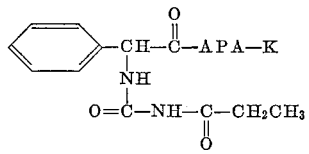

Potassium 6 - [D - α - (3 - propionylureido)phenylacetamido]-penicillanate.—A mixture of 22.7 g. (0.056 mole) of ampicillin trihydrate, 11.8 ml. (0.084 mole) of triethylamine, 30 g. of powdered molecular sieves (Linde 4A), and 190 ml. of methylene chloride was stirred at room temperature for three hours. The molecular sieves were removed by filtration, an additional 50 ml. of methylene chloride being used to wash the filter cake. Propionyl isocyanate [Natio et al., J. Antibiotics (Tokyo), Ser. A. 18, 145–157 (1965)] (8.33 g., 0.084 mole) was added with cooling to keep the temperature at 20–24°. The solution was stirred at room temperature for 1.5 hours and extracted five times with water (total ca. 500 ml.). The combined aqueous extracts were washed three times with ethyl acetate, acidified with 42% phosphoric acid, and extracted three times with ethyl acetate (total ca. 600 ml.). The combined ethyl acetate extracts containing the free acid penicillin were washed three times with water, dried with sodium sulfate, filtered, and treated with 20.2 ml. (0.056 mole) of potassium 2-ethylhexanoate in 1-butanol causing the crystalline potassium salt of the penicillin to precipitate. The volume was concentrated slightly, the product collected by filtration, washed with ethyl acetate and sparingly with acetone, and dried in vacuo over phosphorus pentoxide; yield 15.0 g., M.P. 195–200° dec. The infrared and nuclear magnetic resonance spectra were consistent with potassium 6-[D-α(3-propionylureido)-phenylacetamido]penicillanate.

*Analysis.*—Calcd. for $C_{20}H_{23}N_4O_6SK \cdot 2H_2O$: C, 45.96; H, 5.21; N, 10.72. Found: C, 45.66; H, 5.51; N, 10.31.

The minimum inhibitory concentration (M.I.C.) of this product in mcg./ml. versus a strain of *Pseudomonas aeruginosa* was determined by overnight incubation at 37° C. in nutrient broth by serial two-fold tube dilution and found to be 8 mcg./ml.; in the same experiment the M.I.C. for sodium ampicillin was found to be 125 mcg./ml.

The median curative dose (CD$_{50}$) in mgm./kg. against an overwhelmingly lethal challenge with *Pseudomonas aeruginosa* (strain A9843) was determined by intramuscular injection of this product in mice of the indicated dosage at the time of challenge and again 3, 6, 24, 27 and 30 hours later; thus a dose of 36 mgm./kg. given at each of these six times is reported as 36× 6. Deaths were counted for 72 hours after challenge. The CD$_{50}$ found for this product was 590× 6 mgm./kg.; the CD$_{50}$ for sodium ampicillin in the same experiment was 1400× 6 mgm./kg.

EXAMPLE 9

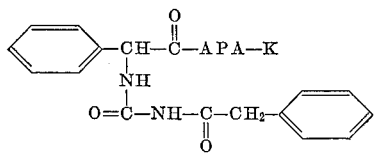

Potassium _ 6 - [D-α-(3-phenylacetylureido)phenylacetamido]penicillanate.—A mixture of 22.7 g. (0.056 mole) of ampicillin trihydrate, 11.8 ml. (0.084 mole) of triethylamine, 30 g. of powdered molecular sieves, and 300 ml. of methylene chloride was stirred for three hours at room temperature. The molecular sieves were removed by filtration. Phenylacetyl isocyanate [Speziale, Smith, J. Org. Chem., 27, 3742 (1962)] (9.99 g., 0.062 mole) was added and the mixture stirred at room temperature for one hour. The reaction mixture was extracted with water. During the second extraction an emulsion formed. Therefore, the methylene chloride was stripped off at reduced pressure, the aqueous extract was combined with the aqueous residue and the whole washed three times with ethyl acetate. The aqueous phase was layered with ethyl acetate, acidified with 42% phosphoric acid, and extracted twice more with ethyl acetate. The combined ethyl acetate extracts were washed three times with water, dried (sodium sulfate), filtered, and treated with 20.4 ml. (0.056 mole) of potassium 2-ethylhexanoate in 1-butanol. The crystalline product was filtered, washed with ethyl acetate and sparingly with acetone, dried in vacuo over phosphorus pentoxide and further dried for 2–3 hours in a vacuum oven at 65°; yield 17.8 g., M.P. 185–187° dec. The infrared and nuclear magnetic resonance spectra were consistent with the desired product.

*Analysis.*—Calcd. for $C_{25}H_{25}O_6N_4SK \cdot 2H_2O$: C, 51.35; H, 5.00; N, 9.58. Found: C, 51.43; H, 5.16; N, 9.62.

The minimum inhibitory concentration (M.I.C.) of this product in mcg.ml. versus a strain of *Pseudomonas aeruginosa* was determined by overnight incubation at 37° C. in nutrient broth by serial two-fold tube dilution and found to be 16 mcg./ml.; in the same experiment the M.I.C. for sodium ampicillin was found to be 125 mcg./ml.

The median curative dose (CD$_{50}$) in mgm./kg. against an overwhelmingly lethal challenge with *Pseudomonas aeruginosa* (strain A9843) was determined by intramuscular injection of this product in mice of the indicated dosage at the time of challenge and again 3, 6, 24, 27 and 30 hours later; thus a dose of 36 mgm./kg. given at each of these six times is reported as 36× 6. Deaths were counted for 72 hours after challenge. The CD$_{50}$ found for this product was 640× 6 mgm./kg.; the CD$_{50}$ for sodium ampicillin in the same experiment was 1400× 6 mgm./kg.

EXAMPLE 10

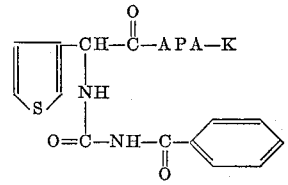

Potassium 6-[D-*a*-(3-benzoylureido) - 3-thienylacetamido)-3-thienylacetamido]-penicillanate.—A mixture of 15 g. (0.037 mole) of 6-(D-α-amino-3-thienylacetamido) penicillanic acid trihydrate, 7.9 ml. (0.056 mole) of triethylamine, 30 g. of powdered molecular sieves (Linde 4A), and 250 ml. of methylene chloride was stirred at room temperature for three hours. Precautions to exclude moisture were taken throughout the experiment. The molecular sieves were removed by filtration. Benzoyl isocyanate [Speziale, Smith, J. Org. Chem., 27, 3742 (1962)] (6.0 g., 0.041 mole) was added and the mixture stirred for one hour at room temperature. The reaction mixture was extracted with water. During the second extraction an emulsion formed which only partially separated. The methylene chloride was stripped off at reduced pressure, the aqueous extracts were combined with the aqueous residue and the whole washed four times with ethyl acetate. The aqueous phase was layered with ethyl acetate, acidified with 42% phosphoric acid, and extracted twice more with ethyl acetate. The combined ethyl acetate extracts were washed three times with water, dried with sodium sulfate, filtered, and treated with 13.5 ml. (0.037 mole) of potassium 2-ethylhexanoate in 1-butanol. A small amount of solvent was stripped off at reduced pressure. The crystalline product was filtered, washed with ethyl acetate and sparingly with acetone, dried in vacuo over phosphorus pentoxide and then in vacuo at 60° for two hours; yield 10 g., M.P. 190–191° dec. The infrared and nuclear magnetic resonance spectra were consistent with the desired product.

*Analysis.*—Calcd. for $C_{22}H_{21}O_6N_4S_2K \cdot 2H_2O$: C, 45.82; H, 4.37; N, 9.72. Found: C, 45.80; H, 480; N, 9.66.

The minimum inhibitory concentration (M.I.C.) of this product in mcg./ml. versus a strain of *Pseudomonas aeruginosa* was determined by overnight incubation at 37° C. in nutrient broth by serial two-fold tube dilution and found to be 8 mcg./ml.; in the same experiment the M.I.C. for sodium ampicillin was found to be 125 mcg./ml.

The median curative dose ($CD_{50}$) in mgm./kg. against an overwhelmingly lethal challenge with *Pseudomonas aeruginosa* (strain A9843) was determined by intramuscular injection of this product in mice of the indicated dosage at the time of challenge and again 3, 6, 24, 27 and 30 hours later; thus a dose of 36 mgm./kg. given at each of these six times is reported as 36×6. Deaths were counted for 72 hours after challenge. The $CD_{50}$ found for this product was 400× 6 mgm./kg.; the $CD_{50}$ for sodium ampicillin in the same experiment was 1400× 6 mgm./kg.

EXAMPLE 11

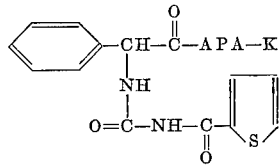

Potassium 6-{D-α-[3 - (2 - thenoyl)ureido]phenylacetamido}-penicillanate.—To the methylene chloride solution of ampicillin triethylammonium salt prepared from 22.7 g. (0.056 mole) of ampicillin trihydrate, 11.8 ml. (0.084 mole) of triethylamine, 30 g. of powdered molecular sieves and 300 ml. of methylene chloride was added 9.5 g. (0.062 mole) of 2-thenoyl isocyanate [Naito et al., J. Antibiotics (Tokyo), Ser. A, 18(4), 145–157 (1965)]. The mixture was stirred at room temperature for one hour. The methylene chloride was partially distilled off at reduced pressure and 300 ml. of water added. The mixture was acidified with 42% phosphoric acid and extracted several times with ethyl acetate. The combined ethyl acetate extracts were extracted four times with a solution of 4.7 g. of sodium bicarbonate in 500 ml. of water. The bicarbonate extracts were washed twice with ethyl acetate (discarded) then layered with ethyl acetate and acidified with 42% phosphoric acid. The aqueous was extracted twice more with ethyl acetate. The combined ethyl acetate extracts were washed twice with water, dried with sodium sulfate, filtered, and 56.0 ml. of 1.12 N potassium 2-ethylhexanoate in 1-butanol added giving a precipitate. The product was filtered, washed with ethyl acetate, and air dried. The material was suspended in ca. 50 ml. of 95% ethanol and water added dropwise until a solution was obtained. The filtered solution was diluted with ethyl acetate and concentrated slightly to azeotrope off some water. After further dilution with ethyl acetate there was obtained crystalline potassium 6 - {D - α - [3- (2 - thenoyl)ureido]phenylacetamido} - pencillanate. The product was filtered, washed with ethyl acetate and sparingly with acetone, dried in vacuo and then for three hours in a vacuum oven at 60°; yield 14.8 g., M.P. 197–198° dec. The infrared and nuclear magnetic resonance spectra were consistent.

*Analysis.*—Calcd. for $C_{22}H_{21}N_4O_6S_2K \cdot 2H_2O$: C, 45.82; H, 4.37; N, 9.71. Found: C, 45.20; H, 3.99; N, 9.45.

The minimum inhibitory concentration (M.I.C.) of this product in mcg./ml. versus a strain of *Pseudomonas aeruginosa* was determined by overnight incubation at 37° C. in nutrient broth by serial two-fold tube dilution and found to be 4 mcg./ml.; in the same experiment the M.I.C. for sodium ampicillin was found to be 250 mcg./ml.

The median curative dose ($CD_{50}$) in mgm./kg. against an overwhelmingly lethal challenge with *Pseudomonas aeruginosa* (strain A9843) was determined by intramuscular injection of this product in mice of the indicated dosage at the time of challenge and again 3, 6, 24, 27, and 30 hours later; thus a dose of 36 mgm./kg. given at each of these six times is reported as 36×6. Deaths were counted for 72 hours after challenge. The $CD_{50}$ for this product was 330× 6 mgm./kg.; the $CD_{50}$ for sodium ampicillin in the same experiment was >800× 6 mgm./kg.

EXAMPLE 12

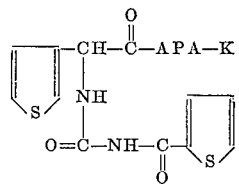

Potassium 6-{D-α-[3-(2-thenoyl)ureido]-3-thienylacetamido}penicillanate.—A mixture of 20.0 g. (0.049 mole) of 6-(D-α-amino-3-thienylacetamido)penicillanic acid trihydrate, 10.5 ml. (0.075 mole) of triethylamine, 30 g. of powdered molecular sieves (Linde 4A), and 250 ml. of methylene chloride was stirred at room temperature for three hours. The molecular sieves were removed by filtration. 2-thenoyl isocyanate [Naito et al., J. Antibiotics (Tokyo) Ser. A, 18(4), 145–157 (1965)] (8.3 g., 0.054 mole) was added and the solution stirred for one hour at room temperature. Water (300 ml.) was added and the mixture was concentrated at reduced pressure until the methylene chloride was removed. The aqueous residue was layered with ethyl acetate and acidified with 42% phosphoric acid. Three more extractions with ethyl acetate were made. The combined ethyl acetate extracts were washed with water (discarded) and extracted with a solution of an equivalent amount of sodium bicarbonate in 300 ml. of water. The bicarbonate extract was washed twice with ethyl acetate. The aqueous phase was layered with ethyl acetate, acidified with 42% phosphoric acid, and the aqueous extracted three more times with ethyl acetate. The combined ethyl acetate extracts containing the penicillin free acid were washed twice with water, dried over sodium sulfate, filtered, and treated with 43.6 ml. of 1.12 N potassium 2-ethylhexanoate in 1-butanol. The solvent was partially distilled off at reduced pressure and the remaining solvent decanted from the gummy residue. Trituration of the residue with anhydrous ether gave a solid which was collected by filtration. The solid was suspended in 95% ethanol and water added dropwise until a solution was obtained. Ethyl acetate was added to the cloud point. Crystallization was allowed to proceed with the occasional addition of more ethyl acetate. The crystalline potassium 6 - {D-α-[3(2-thenoyl)ureido]3-thienylacetamido}penicillanate was collected by filtration, washed with ethyl acetate and sparingly with acetone, and dried in vacuo at 60° for two hours; yield 10.2 g., M.P. 201–202° dec. The infrared and nuclear magnetic spectra were consistent with the desired product.

*Analysis.*—Calcd. for $C_{20}H_{19}N_4O_6S_3K \cdot 2H_2O$: C, 41.22; H, 3.98; N, 9.62. Found: C, 41.76; H, 3.35; N, 9.71.

The minimum inhibitory concentration (M.I.C.) of this product in mcg./ml. versus a strain of *Pseudomonas aeruginosa* was determined by overnight incubation at 37° C. in nutrient broth by serial two-fold tube dilution and found to be 4 mcg./ml.; in the same experiment the M.I.C. for sodium ampicillin was found to be 250 mcg./ml.

The median curative dose ($CD_{50}$) in mgm./kg. against an overwhelmingly lethal challenge with *Pseudomonas aeruginosa* (strain A9843) was determined by intramuscular injection of this product in mice of the indicated dosage at the time of challenge and again 3, 6, 24, 27 and 30 hours later; thus a dose of 36 mgm./kg. given at each of these six times is reported as 36× 6. Deaths were counted for 72 hours after challenge. The $CD_{50}$ found for this product was 320× 6 mgm./kg.; the $CD_{50}$ for sodium ampicillin in the same experiment was >800× 6 mgm./kg.

EXAMPLE 13

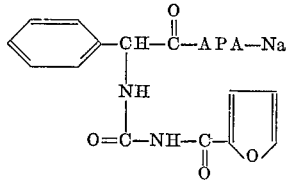

Sodium 6-{D-α-[3-(2-furoyl)ureido]phenylacetamido}penicillanate.—A solution of one g. of potassium 6-{D-α-[3-(2-furoyl)ureido]phenylacetamido}penicillanate trihydrate in 50–75 ml. of water was acidified with 42% phosphoric acid and extracted twice with ethyl acetate. The combined ethyl acetate extracts were washed with water, dried with sodium sulfate, filtered and 0.0019 mole of 50% sodium 2-ethylhexanoate in 1-butanol was added. Crystallization was allowed to proceed at room temperature. The product was collected by filtration and air dried. The product was recrystallized from an ethanol-water-ethyl acetate system in the same manner as the potassium salt. After drying for three hours at 60° there was obtained 370 mg. of the sodium salt; M.P. 192–195° dec. The infrared and nuclear magnetic resonance spectra were consistent for the desired product.

Analysis.—Calcd. for $C_{22}H_{21}N_4O_7SNa \cdot 2H_2O$: C, 48.52; H, 4.63; N, 10.29. Found: C, 48.28; H, 5.07; N, 10.32.

EXAMPLE 14

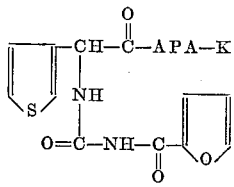

Potassium 6-{D-α-[3-(2-furoyl)ureido]-3-thienylacetamido}penicillanate.—A mixture of 15 g. (0.037 mole) of 6-(D-α-amino-3-thienylacetamido)penicillanic acid trihydrate, 7.9 ml. (0.056 mole) of triethylamine, 30 g. of powdered molecular sieves, and 250 ml. of methylene chloride was stirred at room temperature for three hours. The molecular sieves were removed by filtration. 2-furoyl isocyanate [Naito et al., J. Antibiotics (Tokyo), Ser. A, 18(4), 145–157 (1965)] (5.6 g., 0.041 mole) was added and the mixture stirred at room temperature for one hour. Water (300 ml.) was added to the reaction mixture and the methylene chloride distilled off at reduced pressure. The aqueous residue was layered with ethyl acetate and acidified with 42% phosphoric acid. Two additional extractions with ethyl acetate were made. The combined ethyl acetate extracts were washed twice with water and extracted with a solution of 4.7 g. of sodium bicarbonate in 300 ml. of water. The bicarbonate extract was washed twice with ethyl acetate, layered with ethyl acetate, and acidified with 42% phosphoric acid. The aqueous phase was extracted twice more with ethyl acetate. The combined ethyl acetate extracts containing the penicillin free acid were washed three times with water, dried with sodium sulfate, filtered, and treated with 14.2 ml. of a 50% solution of potassium 2-ethylhexanoate in 1-butanol. The crystalline product was filtered, washed with ethyl acetate and sparingly with acetone, and air dried. The product was suspended in ca. 80 ml. of 95% ethanol and water added until a solution was obtained. Dilution to the cloud point with ethyl acetate gave crystalline potassium 6-{D-α-[3-(2-furoyl)ureido]-3-thienylacetamido}penicillanate; yield after drying in vacuo at 60° for 2.5 hours, 7.3 g., M.P. 189–191° dec. The infrared and nuclear magnetic resonance spectra were consistent for the desired product.

Analysis.—Calcd. for $C_2OH_{19}O_7N_4S_2K \cdot 3H_2O$: C, 41.08; H, 4.31; N, 9.58. Found: C, 41.40; H, 4.37; N, 9.77; $H_2O$, 6.95.

The minimum inhibitory concentration (M.I.C.) of this product in mcg./ml. versus a strain of Pseudomonas aeruginosa was determined by overnight incubation at 37° C. in nutrient broth by serial two-fold tube dilution and found to be 8 mcg./ml.; in the same experiment the M.I.C. for sodium ampicillin was found to be 125 mcg./ml.

The median curative dose ($CD_{50}$) in mgm./kg. against an overwhelming lethal challenge with Pseudomonas aeruginosa (strain A9843) was determined by intramuscular injection of this product in mice of the indicated dosage at the time of challenge and again 3, 6, 24, 27 and 30 hours later; thus a dose of 36 mgm./kg. given at each of these six times is reported as 36× 6. Deaths were counted for 72 hours after challenge. The $CD_{50}$ found for this product was 100× 6 mgm./kg.; the $CD_{50}$ for sodium ampicillin in the same experiment was >800× 6 mgm./kg.

EXAMPLE 15

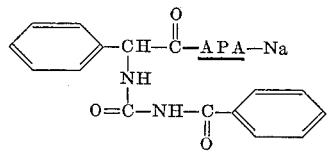

Sodium 6-[L-α-(3-benzoylureido)phenylacetamido]penicillante.—To the methylene chloride solution of triethylammonium 6-(L-α-aminophenylacetamido)penicillanate prepared from 11.4 g. of 6-(L-α-aminoacetamido)penicillanic acid, 5.9 ml. of triethylamine, 15 g. of powdered molecular sieves, and 300 ml. of methylene chloride was added 4.5 g. of benzoyl isocyanate [Speziale, Smith, J. Org. Chem., 27, 3742 (1962)] and the mixture stirred at room temperature for one hour. Water (250 ml.) was added to the reaction mixture and the methylene chloride removed at reduced pressure. The aqueous residue was extracted twice with ethyl acetate, layered with ethyl acetate, and acidified with 42% phosphoric acid. The aqueous phase was extracted twice more with ethyl acetate. The combined ethyl acetate extracts containing the penicillin free acid were washed twice with water and extracted with a solution of 1.35 g. of $NaHCO_3$ in 250 ml. of water. The bicarbonate extracts were washed twice with ethyl acetate, layered with ethyl acetate, and acidified with 42% phosphoric acid. The aqueous phase was extracted twice more with ethyl acetate. The combined ethyl acetate extracts were washed three times with water, dried with sodium sulfate, and treated with 9.2 g. of a 50% solution of sodium 2-ethylhexanoate in 1-butanol.

Some ethyl acetate was stripped off at reduced pressure and fresh ethyl acetate added. The product was filtered and washed with ethyl acetate and sparingly with acetone. The product was suspended in ca. 30 ml. of 95% ethanol and water added dropwise until a solution was obtained. The filtered solution was diluted with ethyl acetate. The product was filtered, washed with ethyl acetate and acetone, and dried in vacuo over phosphorus pentoxide and then at 60° in a vacuum oven for two hours; yield 3.4 g., M.P. 182–185° dec. The infrared and nuclear magnetic resonance spectra were consistent with sodium 6-[L-α-(3-benzoylureido)phenylacetamido]penicillanate.

The minimum inhibitory concentration (M.I.C.) of this product in mcg./ml. versus a strain of Pseudomonas aeruginosa was determined by overnight incubation at

EXAMPLE 16

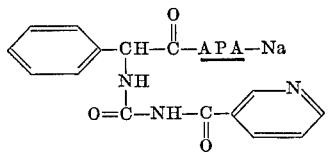

Sodium 6 [D - α - (3 - nicotinoylureido)phenylacetamido)penicillanate.—To a suspension of 12.2 g. (0.1 mole) of nicotinamide in 70 ml. of ethylene dichloride was added 17.5 g. (11.7 ml.) of oxalyl chloride and the mixture refluxed for 18 hours. The solvent was decanted and the solid, resinous residue was washed four times with methylene chloride; yield 14 g.

A mixture of 10.1 g. (0.025 mole) of ampicillin trihydrate, 19.3 ml. (0.138 mole) of triethylamine, 20 g. of powdered molecular sieves and 400 ml. of methylene chloride was stirred at room temperature for three hours. The molecular sieves were removed by filtration. To the filtrate was added the 14 g. of product obtained from the reaction of nicotinamide with oxalyl chloride. The solution was stirred at room temperature for one hour. Water (250 ml.) was added and the methylene chloride removed at reduced pressure. The aqueous residue was adjusted to pH 8 with sodium bicarbonate and washed twice with ethyl acetate. The aqueous phase was layered with ethyl acetate and adjusted to pH 4.5 with 6 N hydrochloric acid. Two more extractions were made on the aqueous phase with ethyl acetate. The combined ethyl acetate extracts were washed twice with water, dried with sodium sulfate, filtered, and treated with 8.4 g. of a 50% solution of sodium 2-ethyl hexanoate in 1-butanol. After concentrating to a small volume the remaining ethyl acetate was decanted and the residue triturated with anhydrous ether. The product was dissolved in wet ethanol and reprecipitated with ethyl acetate; yield 4.4 g., M.P. 190–193° dec. The infrared and nuclear magnetic resonance spectra were consistent with sodium 6 - [D - α - (3 - nicotinoylureido)phenylacetamido]penicillanate.

The minimum inhibitory concentration (M.I.C.) of this product in mcg./ml. versus a strain of *Pseudomonas aeruginosa* was determined by overnight incubation at 37° C. in nutrient broth by serial two-fold tube dilution and found to be 16 mcg./ml.; in the same experiment the M.I.C. for sodium ampicillin was found to be 125 mcg./ml.

EXAMPLE 17

Substitution of an equal weight of 2-pyiridinecarboxylic acid amide and 4-pyridinecarboxylic acid amide, respectively, for the nicotinamide in the procedure of Example 16 produces sodium 6-[D-α-(2-nicotinoylureido)phenylacetamido]penicillanate, and sodium 6-[D-α-(4-nicotinoylureido)phenylacetamido]penicillanate, respectively.

EXAMPLE 18

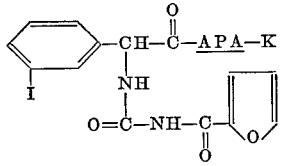

D-α-acetamido-3-iodophenylacetic acid.—To a solution of 50.0 g. (0.24 mole) of D-α-acetamido-3-aminophenylacetic acid in 550 ml. of trifluoroacetic acid at −5° was added 17.0 g. of 97% sodium nitrite gradually during 10 minutes. The solution was stirred at −5° for 25 minutes longer. The diazonium salt solution was added in a steady stream to a vigorously stirred suspension of 79.0 g. of potassium iodide and 2.5 g. of iodine in 300 ml. of trifluoroacetic acid initially at 23°. During the addition the temperature rose to 25–27° and steady gas evolution was noted. The mixture was stirred for 3.5 hours at room temperature until the gas evolution ceased. The reaction mixture was filtered leaving a quantity of dark gummy solid. The filtrate was concentrated to a small volume, water added, and further concentrated. The concentrate containing a solid was treated with dilute sodium thiosulfate and the solid collected by filtration. Recrystallization from 4:1 water −95% ethanol gave 19.5 g. of D-α-acetamido-3-iodophenylacetic acid; M.P. 181–181.5°, $[\alpha]_D^{24°}=-158.0°$ (C. 0.5 95% ethanol).

*Analysis.*—Calcd. for $C_{10}H_{10}INO_3$: C, 37.64; H, 3.16; N, 4.39; I, 39.77. Found: C, 37.80; H, 3.07; N, 4.55; I, 39.20.

D-α-amino-3-iodophenylacetic acid.—D-α - acetamido-3-iodophenylacetic acid (10.0 g.) in 45 ml. of 2 N hydrochloric acid plus sufficient dioxane to give a solution at the boiling point was refluxed for 2.25 hours. The solvent was evaporated to dryness and the residue extracted with water. The insoluble material (solid A) was removed by filtration. The filtrate was evaporated to dryness and the residue in water was adjusted to pH 4.5 with sodium hydroxide giving 1.0 g. of D-α-amino-3-iodophenylacetic acid; M.P. 192–195°, $[\alpha]_D^{24°}=-81°$ (C. 0.5 1 N HCl).

The filtration deposited a second crop of amino acid on storage in the cold; yield 0.6 g., M.P. 203–204.5°, $[\alpha]_D^{24°}=-101.4°$ (C. 0.5 1 N HCl).

Solid A (which was chiefly amide) was hydrolyzed with 45 ml. 2 N hydrochloric acid plus dioxane for two hours at reflux. The residue remaining after evaporation of the solvent was combined with water and again evaporated to dryness. The residue in water was adjusted to pH 4.5 giving 1.9 g. of D-α-amino-3-iodophenylacetic acid; M.P. 196–199°, $[\alpha]_D^{24°}=-95°$ (C. 0.5 1 N HCl).

The infrared and nuclear magnetic resonance spectra of the three fractions were consistent with the desired product.

D-α - amino - 3 - iodophenylacetyl chloride hydrochloride.—A suspension of 2.5 g. (0.009 mole) of D-α-amino-3-iodophenylacetic acid in 100 ml. of methylene chloride at 0 to 5° was gassed with anhydrous hydrogen chloride and 2.5 g. (0.012 mole) of phosphorus pentachloride added. After stirring for 24 hours at 0 to 5° an additional 1.2 g. of phosphorus pentachloride was added and stirring continued for a total of 38 hours. The reaction mixture was diluted with Skellysolve B, the product filtered, washed with Skellysolve B, and dried in vacuo; yield 1.2 g.

6-(D - α - amino - 3 - iodophenylacetamido)pencillanic acid.—A suspension of 0.9 g. of 6-aminopenicillanic acid in 18 ml. of water at 5° was adjusted to pH 7.0–7.2 with 10% sodium hydroxide giving a solution. Acetone (72 ml.) which had been cooled to 5° was added and the solution adjusted to pH 2.5–3.3 with 6 N hydrochloric acid. D-α - amnio - 3 -iodophenylacetyl chloride hydrochloride (1.2 g.) was added slowly while 10% sodium hydroxide was added as needed to maintain the mixture at pH 2.0–2.5. After the addition of the acid chloride was complete the mixture was adjusted to pH 2.9 and stirring continued for five minutes at 0 to 5°. Additional water (18 ml.) and methyl isobutyl ketone (MIBK) were added. The aqeuous phase was separated. The MIBK phase was extracted with 35 ml. of water. The combined aqeuous solutions were adjusted to pH 4.5 with 10% sodium hydroxide causing the product to crystallizze. Concentration of the filtrate after removal of the first crop gave a second crop of product; yield both crops, 975 mg., M.P. 188–194° dec.

*Analysis.*—Calcd. for $C_{16}H_{18}IN_3O_4S \cdot 3H_2O$: C, 36.30; H, 4.57; N, 7.94; I, 23.98. Found: C, 36.35; H, 4.45; N, 7.87; I, 24.15.

Potassium 6-{D-α-[3-(2-furoyl)-ureido]-3-iodophenylacetamido}penicillanate.—This compound is produced by substitution of an equimolar weight of 6-(D-α-amino-3- iodophenylacetamido)penicillanic acid for ampicillin in the procedure of Example 1.

EXAMPLE 19

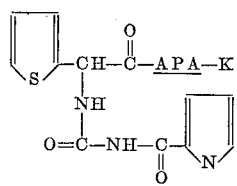

Potassium 6-{D-α-[3-(2-furoyl)ureido]-2-thienylacetamido}penicillanate is produced by replacing the D-α-amino-3-thenylpenicillin of Example 14 with an equal weight of D-α-amino-2-thenylpenicillin in the procedure of that example.

EXAMPLE 20

Replacement of the 2-furoyl isocyanate of Examples 1, 14 and 19 with an equimolar weight of 5-nitro-2-furoylisocyanate produces potassium 6-{D-α-3-(5-nitro-2-furoyl)ureido]phenylacetamido}penicillanate, potassium 6-{D-α-3-(5-nitro - 2 - furoyl)ureido]3 - thienylacetamido} penicillanate and potassium 6-{D-α-3-(5-nitro-2-furoyl)-ureido]2-thienylacetamido}penicillanate, respectively.

5-nitro-2-furoyl isocyanate is prepared according to Naito et al. (ibid., Example 1) from 5-nitro-2-furoic acid amide (Beil., 18, 288).

EXAMPLE 21

The 2-furoyl isocyanate of each of Examples 1, 14 and 19 is replaced by an equimolar weight of the aroyl isocyanate prepared by the method of Speziale and Smith [J. Org. Chem., 27, 3742–3 (1962)] from the corresponding aroyl amide of the following table:

| Amide | Illustrative Sources |
|---|---|
| ⌬—CONH₂ (thiazole) | Acid, acid chloride, amide: Looker, Wilson, J. Heterocyclic Chem, 2 (4), 348 (1965). Acid, acid chloride, ethyl ester: Hurd, Mori, J. Am. Chem. Soc. 77, 5362 (1955). |
| ⌬—CONH₂ (thiazole) | Acid, ethyl ester, amide: U.S. 3,060,187. |
| CH₃—⌬—CONH₂ (isoxazole with CH₃) | Acid, ethyl ester: Beil. 27, 317. Amide: C.A. 58: 3409. Kochetkov, Sokolov, Luboshnikova, Zh. Obschh. Khim. 32, 1778–85 (1962). |
| ⌬—CONH₂ (isoxazole) | Quilico, Panizzi, Gazz. Chim. Ital. 72, 458 (1942). Quilico, Stagno d'Alcontres, Gazz. Chim. Ital. 79, 654 (1949). Mina, Rateb, Soliman, J. Chem. Soc. 1962, 4234. |
| ⌬—CONH₂ (pyrazine) | Amide: Commercially available. |
| CH₃—⌬—CONH₂ (isoxazole) | Amide, acid: Beil. 27, 707. Acid chloride: readily prepared by known methods. |
| Ph—⌬—CONH₂—CH₃ (phenyl-methyl-isoxazole) | Acid, acid chloride: Doyle and Nayler, U.S. 2,996,501 and references cited therein. |
| H₃C—⌬—CONH₂—Ph | Acid, acid chloride: Doyle and Nayler, U.S. 2,996,501 and references cited therein. | to produce, respectively, the compounds of the formulae

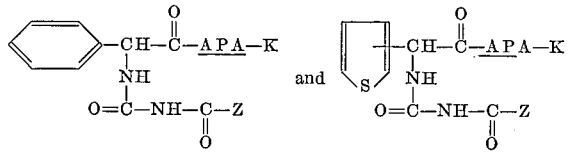

wherein Z is

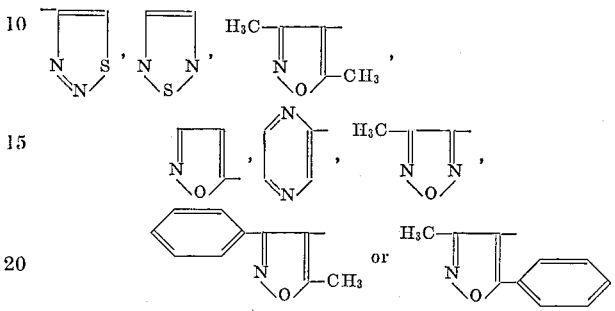

When necessary the amide is prepared by converting the corresponding acid to its acid chloride with thionyl chloride and thence to the amide by treatment of the acid chloride with ammonia in the usual manner.

EXAMPLE 22

The acetyl isocyanate of each of Examples 2, 4 and 7 is replaced by an equimolar weight of the acyl isocyanate of the formula

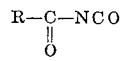

wherein R is dichloromethyl, trichloromethyl, n-propyl, isopropyl, n-butyl, isobutyl, sec.-butyl, t-butyl, n-pentyl, cyclobutyl, cyclopentyl, cyclohexyl and cycloheptyl, respectively to produce, respectively, the corresponding compounds of the formulae

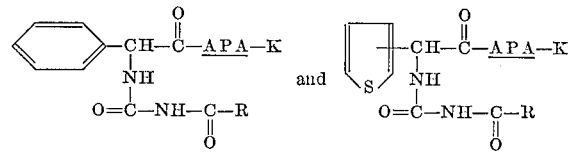

The acyl isocyanates are prepared according to Naito et al. (ibid.) or from the amides of the formula R—CONH₂ according to Speziale and Swith (ibid.).

EXAMPLE 23

The 2-furoyl isocyanate of each of Examples 1, 14 and 19 is replaced by an equimolar weight of the substituted benzoyl isocyanate (see Naito et al., ibid.) of the formula

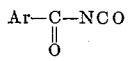

wherein Ar is o-chlorophenyl, m-bromophenyl, p-chlorophenyl, p-methoxyphenyl, p-nitrophenyl and 2,6-dimethoxyphenyl, respectively, to produce, respectively, the corresponding compounds of the formulae

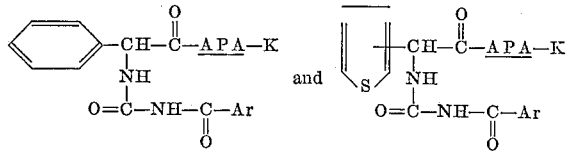

EXAMPLE 24

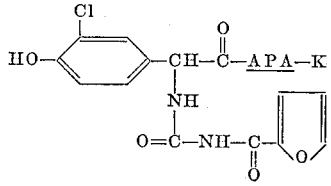

D-(—)-α-amino-α-(3-chloro-4-hydroxyphenyl)glycine.—
To a stirred suspension of 5.01 g. (0.03 mole of D-(—)-2-(p-hydroxyphenyl)glycine in 100 ml. of glacial acetic acid was bubbled in HCl gas at a vigorous rate for about 5 minutes. At first a clear solution resulted and then the hydrochloride salt crystallized out. Next, 4.45 g. (0.033 mole) of sulfuryl chloride (freshly distilled) in 25 ml. of glacial acetic acid was added, with stirring, over a 30 minute period, dropwise. The temperature was 26°–27° C. throughout the addition. After one hour stirring, 250 ml. of dry ether was added slowly and crystallization began. After 15 min. the product was filtered off, washed with dry ether and air dried. The 7 g. obtained was dissolved in 50 ml. of 1 N HCl, filtered, and the pH adjusted, with cooling to 5 with conc. $NH_4OH$. The resulting crystalline product was filtered off after 5 min. standing, washed with two 20 ml. portions of water and 5× with acetone. The vacuum dried material weighed 4.6 g.; dec. pt. 217° C. (sharp). The NMR and IR spectra were consistent with the desired structure. $[\alpha]_{22°\,C.}^{D}$ 137.1° (C=1%, 1 N ACl).

Analysis.—Calcd. for $C_8H_8ClNO_3$: C, 47.76; H, 4.01; Cl, 17.66. Found: C, 47.16; H, 3.92; Cl, 17.96.

Sodium D-(—)-N-(2-hydroxy - 1 - napthylmethylene)-α-amino - α - (3-chloro-4-hydroxyphenyl)-acetate.—To a stirred solution of 8 g. (0.04 mole) of D-(—)-2-(3-chloro-4-hydroxyphenyl)-glycine, 25 ml. $H_2O$, 10 ml. ethanol, and 1.6 g. (0.04 mole) of sodium hydroxide was added, all at once, a warm solution of 7.57 g. (0.044 mole) of 2-hydroxy - 1 - naphthalaldehyde (Aldrich Chemical Company) in 40 ml. of 95% ethanol. The mixture was heated until an initial precipitate redissolved and then was rapidly cooled to about 5° C. and scratched. After cooling one hour in the ice bath the crystalline product was filtered off and air dried. The bright yellow product was recrystallized from 80% ethanol-20% water to give 10.1 g. of vacuum dried product. The infrared and NMR spectra were entirely consistent with the desired structure.

Analysis.—Calcd. for $C_{19}H_{13}ClNO_4Na$: C, 60.37; H, 3.47; Found: C, 60.66; H, 3.72.

6-[D-(—)-2,2-dimethyl - 4 - (3 - chloro-4-hydroxyphenyl) - 5 - oxo - 2(H)-1-imidazolidinyl]-penicillanic acid.—To a stirred and cooled (—10° C.) suspension of 3.78 g. (0.01 mole) of sodium D-(—)-N-(2-hydroxy-1-napthylmethylene) - α - amino-α-(3-chloro-4-hydroxyphenyl)-acetate in 100 ml. of acetone, 5 ml. of p-dioxane and 3 drops of pyridine was added 1.08 g. (0.01 mole) of ethyl chloroformate (EKC). The mixture was stirred at —10° C. for 30 minutes and then cooled to —40° C. and filtered to remove the sodium chloride which precipitated. To this filtrate of the mixed anhydride, vigorously stirred at —15° C., was added all at once, a precooled (0° C.) solution of 2.16 g. (0.01 mole) of 6-aminopenicillanic acid, 1.68 g. (0.02 mole) of $NaHCO_3$ in 50 ml. of water. There was vigorous $CO_2$ evolution for about 5 minutes. The temperature was kept at or below —10° C. for 20 minutes and then was allowed to come to room temperature (22° C.) for over a 30 minute period. To this solution was added 50 ml. of water and the acetone removed under reduced pressure at 20° C. Two 200 ml. ether extracts were taken and discarded. The aqueous layer was then adjusted to pH 2 with 6 N HCl with sufficient acetone added to keep everything in solution. This solution was allowed to stand 30 minutes at 22° C. and then two 300 ml. ether extracts were taken and discarded. The pH was readjusted to 4.7 with 20% NaOH and concentrated under reduced pressure to a volume of 25 ml. at 20° C. A small amount of insoluble material was filtered off and 25 ml. acetone added to the filtrate. The pH was then adjusted to 8.8 with 20% NaOH and the resulting solution to 3 with 40% $H_3PO_4$ and two 100 ml. ethyl acetate extracts taken. The combined ethyl acetate extracts were washed once with 20 ml. $H_2O$ and then filtered and concentrated under reduced pressure at 15° C. to a volume of about 20 ml. The crystalline product was filtered off and slurried in 10 ml. of acetone-water (1:1 by volume) for 10 minutes and filtered again.

The yield was 280 mg. of product decomposing at 182° C. and having IR and NMR spectra entirely consistent with the proposed structure.

Analysis.—Calcd. for $C_{19}H_{22}ClN_3O_5$: C, 51.82; H, 5.04. Found: C, 48.39; H, 5.28.

To a stirred suspension of 600 mg. of 6-[D-(—)-2,2-dimethyl - 4 - (3-chloro - 4 - hydroxyphenyl)-5-oxo-1-imidazolidinyl]-penicillanic acid in 5 ml. water is added 20% sodium hydroxide solution until pH 7 is obtained. The pH is maintained at about 7 with occasional addition of 1 N HCl for four hours and then the pH is adjusted to 4.5 with 1 N HCl and maintained at pH 4.5 for another hour. The crystalline precipitate that forms is separated by filtration, washed with water and dried in vacuo over $P_2O_5$, yielding 102 mg. of the product 6-[D-(—)-α-amino - α - (3-chloro-4-hydroxyphenyl)-acetamido]-penicillanic acid. The infrared spectrum is consistent with the proposed structure having a peak at 1600 cm.$^{-1}$.

Potassium 6-{D-α-[3-(2-furoyl)ureido]3 - chloro - 4 - hydroxyphenylacetamido}penicillanate.—This product is prepared by substituting an equimolar weight of 6-[D-(—)-α-amino-α-(3 - chloro-4-hydroxyphenyl)acetamido] penicillanic acid for the ampicillin in the procedure of Example 1.

EXAMPLE 25

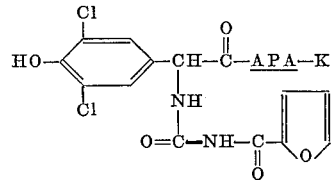

dl-2-(p-methoxyphenyl)-glycine.—To a stirred solution of 19.6 g. (0.4 mole) of NaCN in 80 ml. of $H_2O$ was added 23.6 g. (0.450 mole) of $NH_4Cl$ and 20 ml. of conc. $NH_4OH$ followed by 54.5 g. (0.4 mole) of anisaldehyde in 160 ml. of methanol and the temperature maintained at 37° C. for two hours. The methanol was then removed in vacuo and the remaining mixture extracted with two 150 ml. portions of methyl isobutyl ketone (MIBK) and combined. The combined MIBK extracts were washed once with 30 ml. of $H_2O$ and then 240 ml. of 6 N HCl added with good mixing and the MIBK was removed in vacuo. The resulting slurry was heated at reflux (now in solution) for two hours. One hundred ml. of $H_2O$ was added to the hot solution and then 8 g. of decolorizing carbon added and after ten minutes at gentle reflux the carbon was filtered off and washed with 50 ml. of hot water. The combined filtrates (hot) were stirred and treated with conc. $NH_4OH$ until pH 5–6 was obtained (pH paper). The slurry was then cooled at 5° C. and after one hour the crystals were filtered off and washed with two 100 ml. portions of water. The damp cake was then slurried in 250 ml. of water and 50% NaOH added slowly until the product dissolved. Two 300 ml. ether extracts were then taken and discarded. The pH was then adjusted to 5.5 with 6 N HCl with cooling. After one hour the product was filtered off, washed with 3× 100 ml. $H_2O$ and air dried. Yield 40 g.; dec. 244° C. with sublimation at 230° C.

dl - 2 - (p - methoxyphenyl)-N-(chloro acetyl)-glycine.—To a stirred suspension of 36 g. (0.2 mole) of dl-2-(p-methoxyphenyl)-glycine in 500 ml. of $H_2O$ was added 8 g. (0.2 mole of NaOH pellets and when a clear solution was obtained the solution was cooled at 5° C. and with vigorous stirring 68.2 g. (0.4 mole) of chloroacetic anhydride (warm) was added all at once. Then a solution of 16 g. (0.4 mole) of NaOH in 100 ml. of $H_2O$ was added over a 10 to 15 minute period. More 20% NaOH was added as needed to keep the pH at about 9 for a 1.5 hour period. Next, the pH was adjusted to 2 with 40% H₃PO₄. The product crystallized immediately and was filtered off, washed with water and recrystallized from ethanol-water to give 38 g. of product melting at 182–183° C.

*Analysis.*—Calcd. for C₁₁H₁₂ClNO₁: C, 51.21; H, 4.69. Found: C, 51.49; H, 4.90.

D - (−)-2-(p-methoxyphenyl)-N-chloroacetylglycine and L-(+)-2-(p-methoxyphenyl)-glycine.—To 800 ml. of H₂O stirred at 37° C. was added 38 g. (0.148 mole) of dl - 2 - (p - methoxyphenyl) - N' - chloro-acetylglycine and NH₄OH added dropwise until pH 7.8 was obtained. To the resulting solution was added 2 g. of hog kidney acylase (Sigma Chemical Company) and stirring continued at 37° C. (internal) for 21 hours. The solids containing crude L - (+) - 2 - (p - methoxyphenyl)-glycine were then filtered off and washed with 2× 100 ml. H₂O and the pH of the combined filtrates adjusted to 4–5 with glacial acetic acid. This solution was heated on the steam bath for 30 min. with 5 g. of decolorizing carbon and then filtered. The carbon cake was washed with 50 ml. of warm water and the combined filtrates cooled and acidified to pH 2 with 40% H₃PO₄. After one hour cooling at 0° C. the crystalline product was filtered off and washed with cold water (3×) and air dried. The yield was 16 g. D-(−)-2-(p-methoxyphenyl)-N-chloroacetylglycine and when a second run using 5× the above amounts were used a yield of 83 g. (87% yield) was obtained. M.P. 170°–171° C.; $[\alpha]_D^{25°\ C.}$ −193° (C.=1%, ethanol).

*Analysis.*—Calcd. for C₁₁H₁₂ClNO₄: C, 51.21; H, 4.69. Found: C, 51.50; H, 4.99.

When the solids containing crude L-(+)-2-(p-methoxyphenyl)-N-chloroacetylglycine are treated with hot 3NHCl (200 ml.) and carbon followed by filtration and pH adjustment to 5.5 there is obtained 6 g. (first run) of pure L-(+)-2-(p-methoxyphenyl)glycine. $[\alpha]_D^{25°\ C.}$ +150.4° (C.=1%, 1 N HCl).

D-(−)-2-(p-methoxyphenyl)-glycine.—The 16 g. of D-(−)-2-(p-methoxyphenyl)-N-(chloroacetyl) - glycine was refluxed 1.5 hours in 170 ml. of 2 N HCl. The resulting clear solution was filtered and cooled at 5° C. and the pH adjusted to 5.5 with NH₄OH.

The product was then filtered off after cooling 30 min. and washed with 3× 25 ml. of cold water. The dried material D - (−) - 2 - (p-methoxyphenyl)-glycine weighed 9.5 g. A *second* run gave 54 g.

$[\alpha]_{25°\ C.}^D$ −149.9° (C.=1%, 1 N HCl) (first run)
$[\alpha]_{25°\ C.}^D$ −148.1° (C.=1%, 1 N HCl) (second run)

*Analysis.*—Calcd. for C₉H₁₁NO₃: C, 59.67; H, 6.13; N, 7.74. Found: C, 59.38; H, 6.16; N, 8.00.

D-(−)-2-(p-hydroxyphenyl)-glycine.—A mixture of 1.81 g. (0.01 mole) of D-(−)-2-(p-methoxyphenyl) glycine. $[\alpha]_{25°\ C.}^D$ −149.9° (C.=1%, 1 N HCl) and 10 ml. of 48% HBr was heated at gentle reflux for 2 hours. The resulting solution was concentrated at reduced pressure at 30° C. to a wet solid. A minimum amount of water (20° C.) was added to dissolve the HBr salt and with cooling NH₄OH was added to pH 5. The resulting thick gel which ppt. was warmed to 50° C. and when solution was nearly obtained a different crystalline form began to ppt. Upon cooling 30 min. at 0°–5° C. there was obtained 990 mg. of cold water washed (3× 1 ml.) and air dried material, D-(−)-2-(p-hydroxyphenyl)-glycine. $[\alpha]_D^{25°\ C.}$ −161.2° (C.=1%, 1 N HCl) dec. pt. 223° C. A second run using 20× the above amounts gave 24.5 g. of material. $[\alpha]_D^{25°\ C.}$ −153° (C.=1%, 1 N HCl).

*Analysis.*—Calcd. for C₈H₉NO₃: C, 57.49; H, 5.43; N, 8.39. Found: C, 57.41; H, 5.67; N, 8.39.

D-(−)-2-(3,5-dichloro-4-hydroxyphenyl) - glycine.— To a stirred suspension of 5.01 g. (0.03 mole) of D-(−)-2-(4-hydroxyphenyl)-glycine in 100 ml. of glacial acetic acid was bubbled in HCl gas at a vigorous rate for about 5 minutes. At first a clear solution resulted and then the hydrochloride salt crystalized out. Next, 9.0 g. (0.067 mole) of sulfuryl chloride (freshly distilled) in 25 ml. of glacial acetic acid was added, with stirring, over a 30 minute period, dropwise. The temperature was 26°–27° C. throughout the addition. After the sulfuryl chloride addition, the slurry was heated to 70° C. for 30 minutes and then stirred at ambient temperature for two hours. Then 250 ml. of dry ether was added slowly and crystallization began. After 15 min. the product was filtered off, washed with dry ether and air dried. The 7 g. obtained was dissolved in 100 ml. of 1 N HCl, filtered, and pH adjusted, with cooling to 5 with conc. NH₄OH. The resulting crystalline product was filtered off after 5 min. standing, washed with two 20 ml. portions of water and 5× with acetone. The vacuum dried material weighed 4.5 g.; dec. pt. 210° C. (sharp). The NMR and IR spectra were consistent with the desired structure. $[\alpha]_D^{22°\ C.}$ −126.3° (C.=1%, 1 N HCl).

*Analysis.*—Calcd. for C₈H₇Cl₂NO₃: C, 40.78; H, 2.99; Cl, 30.04. Found: C, 41.85; H, 3.22; Cl, 27.80.

Sodium D-(−)-N-(2-hydroxy-1-napthylmethylene)-2-amino-2-(3,5-dichloro-4-hydroxyphenyl)-acetate).—To a stirred solution of (0.04 mole) of D-(−)-2-(3,5-dichloro-4-hydroxyphenyl)glycine 25 ml. H₂O, 10 ml. ethanol, and 1.6 g. (0.4 mole) of sodium is added, all at once, a warm solution of 7.57 g. (0.044 mole) of 2-hydroxy-1-naphthaldehyde (Aldrich Chemical Company) in 40 ml. of 95% ethanol. The mixture is heated until an initial precipitate redissolves and then is rapidly cooled to about 5° C. and scratched. After cooling one hour in the ice bath the crystalline product is filtered oc and air dried. The infrared and NMR spectra are entirely consistent with the desired structure.

6 - [D-(−) - 2,2 - dimethyl-4-(3,5-dichloro-4-hydroxyphenyl)-5-oxo-1-imidazolidinyl]penicillanic acid.—To a stirred and cooled (−10° C.) suspension of (0.01 mole) of sodium D-(−)-N-(2-hydroxy-1 naphthalmethylene)-α-amino-α-(3,5-dichloro-4-hydroxyphenyl) acetate in 100 ml. of acetone, 5 ml. of p-dioxane and 3 drops of pyridine is added 1.08 g. (0.01 mole) of ethyl chloroformate (EKC). The mixture is stirred at −10° C. for 30 minutes and then cooled to −40° C. and filtered to remove the sodium chloride which precipitated. To this filtrate of the mixed anhydride, vigorously stirred at −15° C. is added, all at once, a precooled (0° C.) solution of 2.16 g. (0.01 mole) of 6-aminophenicillanic acid, 1.68 g. (0.02 mole) of NaHCO₃ in 50 ml. of water. There is vigorous CO₂ evolution for about 5 minutes. The temperature is kept at or below −10° C. for 20 minutes and then allowed to come to room temperature (22° C.) for over a 30 minute period. To this solution is added 50 ml. of water and the acetone removed under pressure at 20° C. Two ml. ether extracts are taken and discarded. The aqueous layer is then adjusted to pH2 with 6 N HCl with sufficient acetone added to keep everything in solution. This solution is allowed to stand 30 minutes at 22° C. and then two 300 ml. ether extracts are taken and discarded. The pH is readjusted to 4.7 with 20% NaOH and concentrated under reduced pressure to a volume of 25 ml. at 20° C. A small amount of insoluble material is filtered off and 25 ml. acetone added to the filtrate. The pH is then adjusted to 8.8 with 20% NaOH and the resulting solution let stand at 10° C. for 5 hours. The pH is adjusted to 3 with 40% H₃PO₄ and two 100 ml. ethyl acetate extracts taken. The combined ethyl acetate extracts are washed once with 20 ml. H₂O and then filtered and concentrated under reduced pressure at 15° C. to a volume of about 20 ml. The crystalline product is filtered off and slurried in 10 ml. of acetone-water (1:1 by volume) for 10 minutes and filtered again.

The product obtained D-(−)-6-[2,2-dimethyl-4-(3,5-dichloro - 4-hydroxyphenyl) 5-oxo-1-imidazolidinyl]penicillanic acid and having IR and NMR spectra entirely consistent with the proposed structure.

6 - [D - (−) - α - amino-α-(3,5-dichloro-4-hydroxyphenyl)acetamido]penicillanic acid.—To a stirred suspension of 600 mg. of 6-[D-(—)-2,2-dimethyl-4-(3,5-dichloro - 4 - hydroxyphenyl) - 5-oxo-1-imidazolidinyl]-penicillanic acid in 5 ml. of water is added 20% sodium hydroxide solution until pH 7 is obtained. The pH is maintained at about 7 with occasional addition of 1 N HCl for four hours and then the pH is adjusted to 4.5 with 1 N HCl and maintained at pH 4.5 for another hour. The crystalline precipitate that forms is separated by filtration, washed with water and dried in vacuo over $P_2O_5$, yielding the product 6 - [D - (—) - α-amino-α-(3,5-dichloro-4-hydroxyphenyl)-acetamido]penicillanic acid. The infrared spectrum is consistent with the proposed structure having a peak at 1600 cm.$^{-1}$.

Potassium 6-{D-α-[3-(2-furoyl)ureido]-3,5-dichloro-4-hydroxyphenylacetamido}penicillanate.—This product is prepared by substituting an equimolar weight of 6-[D-(—) - α - amino - (3,5 - dichloro-4-hydroxyphenyl)-acetamido]penicillanic acid for the ampicillin in the procedure of Example 1.

EXAMPLE 26

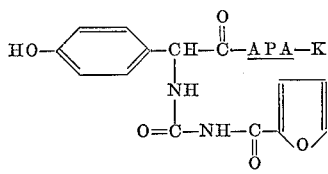

Potassium 6 - {D - α - [3-(2-furoyl)ureido]-4-hydroxyphenylacetamido}penicillanate.—This product is prepared by substituting for the ampicillin in the procedure of Example 1 an equimolar weight of 6-[D-(—)-α-amino-α-(4-hydroxyphenyl)acetamido]penicillanic acid which is prepared from D-α-(4-hydroxyphenyl)glycine, as by the methods known in the art and that given above for D-α-(3,5-dichloro-4-hydroxyphenyl)glycine and D-α-amino-4-iodophenylacetic acid [also called D-α-4-iodophenyl) glycine].

EXAMPLE 27

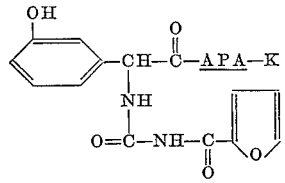

Potassium 6 - {D - α - [3-(2-furoyl)ureido]-3-hydroxyphenylacetamido}penicillanate.—This product is prepared by substituting for the ampicillin in the procedure of Example 1 an equimolar weight of 6-[D-(—)-α-amino-α-(3-hydroxyphenyl)-acetamido]penicillanic acid which is prepared from D-α-(3-hydroxyphenyl)glycine, as by the methods known to the art, e.g., British Patent 991,586, and those illustrated above for D-α-(3,5-dichloro-4-hydroxyphenyl)glycine and D-α-(4-iodophenyl)glycine.

D - α - (3 - hydroxyphenyl)glycine is prepared by the methods known to the art and also, preferably, by the following procedures:

(1) Resolution of DL-α-amino - 3 - methoxyphenylacetic acid.—DL-α-amino-3-methoxyphenylacetic acid [A. H. Neims, D. C. DeLuca, L. Hellerman, Biochemistry, 5(1), 203 (1966)] was resolved with d-10-camphorsulfonic acid in water.

DL-α-amino-3-methoxyphenylacetic acid (33.1 g., 0.182 mole) was added to a solution of 46.4 g. (0.2 mole of d-10-camphorsulfonic acid in 135 ml. of water at 50 to 60°. The solution was filtered and stored in the cold for 20 hours. The precipitated amino acid d-10-camphorsulfonate salt was collected by filtration. The salt was repeatedly recrystallized from water until a sample of the amino acid regenerated from it showed no further change in optical rotation. Thus, after three recrystallizations from water, there was obtained 3.7 g. of the d-10-camphorsulfonate salt of D-α-amino-3-methxyphenylacetic acid; M.P. 184–185° dec. The salt (1.4 g.) was dissolved in about 10 ml. of water by warming. The solution was adjusted to pH 5–6 with concentrated ammonium hydroxide. The product was allowed to crystallize first at room temperature and then in an ice bath giving, after filtration and drying in vacuo over phosphorus pentoxide, 0.36 g. of D-α-amino-3-methxyphenylacetic acid; M.P. 178–181° dec., $[\alpha]_D^{24°} = -129.0°$ (C. 0.5 1 N HCl). A portion of the amino acid was recrystallized from water and dried in vacuo over phosphorus pentoxide; M.P. 180–182° dec., $[\alpha]_D^{24°} = -136°$ (C. 0.08 1 N HCl).

Analysis.—Calcd. for $C_9H_{11}NO_3 \cdot \frac{1}{3}H_2O$: C, 57.74; H, 6.28; N, 7.48. Found: C, 57.70, 57.76; H, 6.23; N, 7.21.

D-α-amino-3-hydroxyphenylacetic acid hydrobromide monohydrate.—D-α-amino - 3 - methoxyphenylacetic acid (2.9 g., 0.016 mole) and 16 ml. of 48% hydrobromic acid were refluxed for two hours. The volatile materials were removed at reduced pressure. Water (about 15 ml.) was added to the residue and this removed at reduced pressure. This was repeated once. The residue was dried in vacuo to remove all water. The dried residue was recrystallized by dissolving in 2-propanol and adding Skellysolve B to the cloud point. After drying there was obtained 3.0 g. of D-α-amino-3-hydroxyphenylacetic acid hydrobromide monohydrate; M.P. 156–162° dec., $[\alpha]_D^{24°} = -62°$ (C. 0.1 water). The infrared and nuclear magnetic resonance spectra were consistent with the desired product.

Analysis.—Calcd. for $C_8H_9NO_3 \cdot HBr \cdot H_2O$: C, 36.10; H, 4.55; N, 5.26. Found: C, 37.03; H, 5.12; N, 5.34.

(2) D-α-acetamido-3-nitrophenylacetic acid.—A stirred suspension of 49.8 g. (0.254 mole) of D-α-amino-3-nitrophenylacetic acid [P. Fries, K. Kjaer, Acta Chimica Scand., 17, 2391 (1963)] in 500 ml. of water was cooled in an ice bath and a solution of 8.36 g. (0.209 mole) of NaOH in 40 ml. of water was added causing most of the solid to dissolve. There was immediately added 42.7 g. (0.418 mole) of acetic anhydride followed by the addition as needed of a solution of 25.1 g. (0.627 mole) of sodium hydroxide to maintain the pH value at about 7. The reaction mixture was stirred in the ice bath for an additional 15 minutes, filtered, and adjusted to pH 1.8 with concentrated hydrochloric acid. The crystalline product was collected by filtration and washed with water; yield 25 g., M.P. 172–174° dec. The product was twice recrystallized from 1:1 95% ethanol-water giving, after drying in vacuo over phosphorus pentoxide, 11.8 g. of D-α-acetamido - 3 - nitrophenylacetic acid, M.P. 183–185°; $[\alpha]_D^{24°} = -179.4°$ (C. 0.5 95% ethanol). The infrared and nuclear magnetic resonance spectra were consistent with the desired compound.

Analysis.—Calcd. for $C_{10}H_{10}N_2O_5$: C, 50.42; H, 4.23; N, 11.76. Found: C, 50.56; H, 4.20; N, 11.73.

D-α-acetamido-3-aminophenylacetic acid.—A solution of 9 g. (0.0378 mole) of D-α-acetamido-3-nitrophenylacetic acid in 150 ml. of methanol was hydrogenated using 0.6 g. of 5% palladium on carbon at an initial pressure of 50 p.s.i. on a Paar hydrogenation apparatus for 30 minutes. The hydrogenation bottle was cooled with a jet of air to keep the temperature under 40°. The catalyst was removed by filtration. Evaporation of the filtrate gave a crystalline product. Two recrystallizations from 1-propanol gave 3.4 g. of D-α-acetamido-3-aminophenylacetic acid, M.P. 200–201° dec.; $[\alpha]_D^{24°} = -174.4°$ (C. 0.5 water).

Analysis.—Calcd. for $C_{10}H_{12}N_2O_3$: C, 57.71; H, 5.81; N, 13.46. Found: C, 57.78; H, 5.97; N, 13.35.

D-α-amino-3-hydroxyphenylacetic acid.—A solution of 2.1 g. (0.01 mole) of D-α-acetamido-3-aminophenylacetic acid in 35 ml. of trifluoroacetic acid was cooled to —5° and 0.69 g. (0.01 mole) of solid sodium nitrite added. After stirring for 20 minutes at —5° acetic acid (5 ml.) was added. The mixture was stirred at 45 to 50° for one and one-half hours and then heated on the steam bath for one-half hour. The cold reaction mixture was poured onto 30 g. of crushed ice. The volatile materials were distilled at reduced pressure leaving as residue a slightly brown viscous oil. The residue was combined with 30 ml. of 2 N hydrochloric acid and refluxed for one and one-half hours. The volatile materials were removed under reduced pressure. Water was added to the residue and this removed under reduced pressure causing the hydrochloride salt of the product to crystallize. The residue was dissolved in a minimum amount of water, adjusted to pH 4.5 with 20% sodium hydroxide, filtered, and stored in the cold giving 0.43 g. of crystalline D-α-amino-3-hydroxyphenylacetic acid, M.P. 204–206° dec. The filtrate was stripped to dryness and a small amount of water added to the crystalline residue giving a 2nd crop (0.46 g.) of the amino acid.

The filtrate from the 2nd crop plus 3 ml. of concentrated hydrochloric acid were concentrated to dryness. The residue was dissolved in a small amount of water by warming, cooling gave crystalline D-α-amino-3-hydroxyphenylacetic acid hydrochloride monohydrate; yield 0.5 g., M.P. 150–153° dec., $[\alpha]_D^{24°}=-91.2°$ (C. 0.5 water). The infrared and nuclear magnetic resonance spectra were consistent with the desired product.

*Analysis.*—Calcd. for $C_8H_9NO_3 \cdot HCl \cdot H_2O$: C, 43.35; H, 5.46; N, 6.32. Found: C, 42.7; H, 5.6; N, 6.17; residue, 1.45. Values corrected for 1.45% residue: C, 43.3; H, 5.7; N, 6.26.

The two crops of D-α-amino-3-hydroxyphenylacetic acid were combined, suspended in a small amount of water, 2 ml. of 48% hydrobromic acid added and the filtered solution evaporated to dryness. The residue was twice recrystallized from water giving 150 mg. of D-α-amino-3-hydroxyphenylacetic acid hydrobromide monohydrate; M.P. 172–175° dec., $[\alpha]_D^{24°}=-74°$ (C. 0.1 water). The infrared and nuclear magnetic resonance spectra were consistent with the assigned structure.

*Analysis.*—Calcd. for $C_8H_9NO_3 \cdot HBr \cdot H_2O$: C, 36.10; H, 4.55; N, 5.26. Found: C, 36.20; H, 4.62; N, 5.32.

(3) A solution of 38.4 g. (0.1845 mole) of D-α-acetamido-3-aminophenylacetic acid in 600 ml. of trifluoroacetic acid prepared at 15 to 20° was cooled to 5° and 13 g. (0.1845 mole) of 98% sodium nitrite added in portions during a 10-minute period with stirring at −5°. After stirring for an additional 25 minutes 90 ml. of acetic acid was added at −5 to 0°. The mixture was heated at 45 to 50° for one and one-half hours (gas evolution), refluxed for one-half hour, cooled, and poured onto 500 g. of ice flakes. The volatile materials were removed at reduced pressure. The residue was refluxed with 400 ml. of 2 N hydrochloric acid for one hour. Concentration to a small volume gave the crystalline hydrochloride salt. The dried product (27 g.) was recrystallized from wet acetic acid (150 ml. acetic acid plus 7 ml. of water) giving 21 g. of D-α-amino-3-hydroxyphenylacetic acid hydrochloride monohydrate; M.P. 149–152° dec., $[\alpha]_D^{24°}=-103.0°$ (C. 0.5 water).

EXAMPLE 28

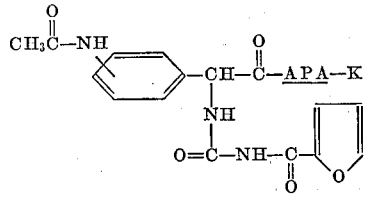

Potassium 6-{D-α-[3-(2-furoyl)ureido]-(3- and 4-acetamido)phenylacetamido}penicillanate.—These two products are prepared by substituting for the ampicillin in the procedure of Example 1 an equimolar weight of the 6-[D-α-amino-(3- and 4-acetamido)phenylacetamido]penicillanic acids which are prepared from the D-α-amino-3- and 4-acetamidophenylacetic acids as taught above and in the art.

The necessary D-α-amino-3- and 4-acetamidophenylacetic acids are each prepared by the methods known to the art and also, preferably, by the following procedures:

(A) D-α-acetamido-phenylacetic acid.—A suspension of 50 g. (0.331 mole) of D-(−)-2-phenylglycine in 700 ml. if water was cooled to 0 to 5° and 13.2 g. (0.331 mole) of sodium hydroxide was added with stirring giving a solution. Acetic anhydride (67.5 g., 0.662 mole) was added rapidly in one portion to the vigorously stirred solution which was initially cooled to 0 to 5° by means of a salt-ice cooling bath. This was immediately followed by the addition of a solution of 39.7 g. (0.993 mole) of sodium hydroxide in 200 ml. of water in a rapid stream from a dropping funnel. The temperature rose to a maximum of about 25°. The solution was stirred for an additional fifteen minutes in the cooling bath and then acidified with concentrated hydrochloric acid. The precipitated product was collected by filtration, washed on the filter with water and recrystallized from 1:1 95% ethanol-water; yield 46.0 g. (72%), M.P. 186–188°, $$[\alpha]_D^{24°}=-217.9°$$

(C.=1, 95% EtOH). This compound is reported in Beil., 14, 591.

D-α-acetamido-4-nitrophenylacetic acid.—D - α - acetamidophenylacetic acid (20 g., 0.104 mole) was slowly added to 50 ml. of concentrated sulfuric acid with cooling as needed to maintain the temperature at 20 to 25°. The mixture was stirred for about 20 minutes until most of the solid dissolved. Nitric acid (90%, d=1.5, 9.7 ml., 0.208 mole) was added dropwise at such a rate to the stirred mixture that the salt-ice cooling bath maintained the temperature in the range 0 to −5°. The reaction mixture was stirred at −5 to −10° for an additional 30 minutes and then poured onto about 300 g. of ice flakes. The white crystalline product was collected by filtration, washed with water and recrystallized three times from 1:1 95% ethanol-water; M.P. 180–182° dec., yield 11.5 g. (46.4%). An additional recrystallization from ethyl acetate did not change the melting point; $[\alpha]_D^{24°}=-206.4°$ (C.=0.5, 95% EtOH).

*Analysis.*—Calcd. for $C_{10}H_{10}N_2O_5$: C, 50.42; H, 4.23; N, 11.76. Found: C, 50.14; H, 4.07; N, 11.96.

D-α-acetamido-4-aminophenylacetic acid.—A solution of 15 g. (0.063 mole) of D-α-acetamido-4-nitrophenylacetic acid in 250 ml. of 95% ethanol was hydrogenated in the presence of 0.6 g. of 5% palladium on carbon on a Paar hydrogenator at an initial pressure of 50 p.s.i. for 64 minutes. The product had crystallized from the hydrogenation mixture. Approximately 200 ml. of water was added, the mixture warmed to dissolve the product and the catalyst removed by filtration. Chilling the filtrate gave 9.9 g. of product, M.P. 192–195° dec. The product was recrystallized four times from 1:1 95% ethanol-water; wt. 4.8 g., M.P. 207–209° dec., $[\alpha]_D^{24°}=-182.2°$ (C.=0.5, 1 N HCl).

*Analysis.*—Calcd. for $C_{10}H_{12}N_2O_3$: C, 57.71; H, 5.81; N, 13.46. Found: C, 57.61; 57.64; H, 5.67; N, 13.18.

D-α-amino-4-acetamidophenylacetic acid.—D - α - acetamido-4-aminophenylacetic acid (39.2 g., 0.188 mole) in 400 ml. of 2 N hydrochloric acid was refluxed for 2 hours. The mixture was concentrated to dryness at reduced pressure. Water was added and the solution again concentrated to dryness. This was repeated once. The crystalline residue was slurried with 2-propanol, filtered, and washed additionally with 2-propanol giving, after air drying, 47 g. of the hydrochloride of D-amino-4-aminophenylacetic acid.

Ten g. of the hydrochloride in 40 ml. of water was adjusted to pH 4.8 with 20% sodium hydroxide. Crystalline D-α-amino-4-aminophenylacetic acid separated. To the solution obtained by adding 160 ml. additional of water was added 10 ml. of thioacetic acid. The mixture was stirred for 17 hours at 24° under a nitrogen atmosphere. The reaction mixture, containing a quantity of crystalline product, was concentrated to one-half of its initial volume giving 4.5 g. of product. The crude product was suspended in water, the suspension adjusted to pH 4.6 with 20%

NaOH, heated to 95°, carbon treated, and the product allowed to crystallize in the cold overnight. The resulting gelatinous mass was broken up by warming. The solid was removed by filtration; wt. 0.2 g., M.P. 203–206° dec. The filtrate was diluted with an equal volume of 95% ethanol giving 1.4 g. of D-α-amino-4-acetamidophenylacetic acid; M.P. 214–215° dec., $[\alpha]_D^{24°} = -133.4°$ (C.=0.5, 1 N HCl).

*Analysis.*—Calcd. for $C_{10}H_{12}N_2O_3$: C, 57.71; H, 5.814; N, 13.46. Found: C, 56.80, 56.72; H, 5.84, 5.89; N, 13.62; $H_2O$, 1.32. Found values corrected for 1.32% water: C, 57.52; H, 5.71; N, 13.80.

(B) D-α-amino-3-aminophenylacetic acid.—A solution of 9.8 g. (0.05 mole) of D-α-amino-3-nitrophenylacetic acid [P. Friis and A. Kjaer, Acta Chimica Scand., 17, 2391 (1963); British patent specification, 1,033,257] in 200 ml. of water was prepared by adjusting the mixture to pH 9.3 with concentrated ammonium hydroxide. The solution was hydrogenated for 1 hour in the presence of 0.4 g. of 5% palladium on carbon on a Paar hydrogenation apparatus at an initial pressure of 50 p.s.i. The vessel was cooled as needed to keep the temperature from going above 30°. After 1 hour an additional 0.4 g. of catalyst was added and hydrogenation continued for 1 hour longer. Three additional runs were made hydrogenating a total of 39.4 g. of nitro compound. Addition of the second amount of catalyst was omitted in the additional runs and a hydrogenation time of about 1 hour was used. Each run was filtered to remove catalyst, the filtrates pooled and concentrated to a small volume until crystallization of the product started. The concentrate was diluted with about five volumes of 95% ethanol, the mixture stored overnight in the cold and the product filtered and washed further by slurring with 95% ethanol. After drying in a vacuum oven for 3 hours at 40° and then in vacuo over phosphorus pentoxide for 64 hours there was obtained 25.7 g. of D-α-amino-3-aminophenylacetic acid; M.P. 188–191°, $[\alpha]_D^{24°} = -139.0$ (C.=1 N HCl).

The preparation of this compound has been described by P. Friis and A. Kjaer, Acta Chimica Scand., 17, 2391 (1963).

D-α-amino-3-acetamidophenylacetic acid.—A mixture of 5 g. (0.0301 mole) of D-α-amino-3-aminophenylacetic acid and 5 ml. of thioacetic acid in 100 ml. of water was stirred for 16 hours under a nitrogen atmosphere. The mixture was heated on a steam bath for one-half hour and then concentrated at reduced pressure to a small volume. On cooling the concentrate the product started to crystallize. The concentrate was diluted with 95% ethanol and, after chilling in an ice bath, the product was filtered and washed with 95% ethanol; wt. 1.8 g. The filtrate was further diluted with 95% ethanol giving an additional 2.3 g. of product. The two crops of product were combined, dissolved in a small amount of water by warming, the solution concentrated slightly and diluted with a large volume of 95% ethanol. The initial crop of solid was removed by filtration and the filtrate stored in the cold for 16 hours giving, after drying at 65° for 3 hours in vacuo over phosphorus pentoxide, 0.90 g. of product, M.P. 185–187° dec. The product was twice recrystallized from 1:1 95% ethanol-water; wt. 0.36 g., M.P. 186–187° dec., $[\alpha]_D^{24°} = -120°$ (C.=0.5, 1 N HCl).

*Analysis.*—Calcd. for $C_{10}H_{12}N_2O_3$: C, 57.7; H, 5.81; N, 13.5. Found: C, 47.29; H, 6.79; N, 11.21; $H_2O$, 18.3. Found values corrected for 18.3% water: C, 57.9; H, 5.83; N, 13.7.

EXAMPLE 29

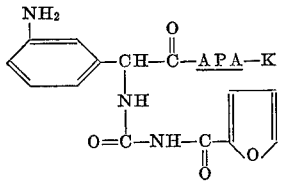

Potassium 6-{D-α-[3-(2-furoyl)ureido]-3-aminophenylacetamido}penicillanate.—This product is prepared by substituting for the ampicillin in the procedure of Example 1 an equimolar weight of 6-[D-α-amino-3-aminophenylacetamido]-penicillanic acid which is prepared in turn either by the procedure of Pritish Patent 1,033,257 or from 2-(3-amino-phenyl)glycine by the acylation procedure of U.S. Patent 3,140,282.

EXAMPLE 30

When in the procedure of Example 5 the D-α-aminobenzylpenicillin used therein is replaced with 56 mmoles of:

D-α-amino-p-sulfamylbenzylpenicillin,
D-α-amino-p-chlorobenzylpenicillin,
D-α-amino-p-methoxybenzylpenicillin,
D-α-amino-p-diethylaminobenzylpenicillin,
D-α-amino-p-trifluoromethylbenzylpenicillin,
D-α-amino-2,4-dibromobenzylpenicillin,
D-α-amino-o-nitrobenzylpenicillin,
D-α-amino-m-methylbenzylpenicillin,
D-α-amino-m-iodobenzylpenicillin,
D-α-amino-o-acetamidobenzylpenicillin,
D-α-amino-2,6-dichlorobenzylpenicillin,
D-α-amino-o-chlorobenzylpenicillin, and
D-α-amino-2-chloro-6-fluorobenzylpenicillin, respectively, the following penicillins are produced:

sodium-D-α-(3-benzoylureido)-p-sulfamylbenzylpenicillin,
sodium-D-α-(3-benzoylureido)-p-chlorobenzylpenicillin,
sodium-D-α-(3-benzoylureido)-p-methoxybenzylpenicillin,
sodium-D-α-(3-benzoylureido)-p-diethylaminobenzylpenicillin,
sodium-D-α-(3-benzoylureido)-p-trifluoromethylbenzylpenicillin,
sodium-D-α-(3-benzoylureido)-2,4-dibromobenzylpenicillin,
sodium-D-α-(3-benzoylureido)-o-nitrobenzylpenicillin,
sodium-D-α-(3-benzoylureido)-m-methylbenzylpenicillin,
sodium-D-α-(3-benzoylureido)-o-iodobenzylpenicillin,
sodium-D-α-(3-benzoylureido)-o-acetamidobenzylpenicillin,
sodium-D-α-(3-benzoylureido)-2,6-dichlorobenzylpenicillin,
sodium-D-α-(3-benzoylureido)-o-chlorobenzylpenicillin, and
sodium-D-α-(3-benzoylureido)-2-chloro-6-fluorobenzylpenicillin, respectively.

EXAMPLE 31

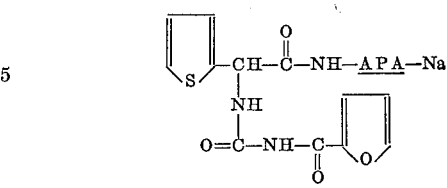

Sodium 6-(D-α-[3 - (2 - furoyl)ureido] - 2 - thienylacetamido)penicillanate.—A mixture of 15 g. (0.037 mole) of 6-(D-α-amino-3-thienylacetamido)penicillanic acid trihydrate, 7.9 ml. (0.056 mole) of triethylamine, 30 g. of powdered molecular sieves (Linde 4A), and 250 ml. of methylene chloride was stirred at room temperature for three hours. The molecular sieves were removed by filtration. 2-furoyl isocyanate [Naito et al., J. Antibiotics (Tokyo), Ser. A, 18(4), 145–157 (1965)] was added and the mixture stirred at room temperature for one hour. Water (300 ml.) was added to the reaction mixture and the methylene chloride distilled off at reduced pressure. The aqueous residue was layered with ethyl acetate and acidified with 42% phosphoric acid. Two additional extractions with ethyl acetate were made. The combined ethyl acetate extracts containing the new penicillin in the free acid form were washed thrice with water and extracted three times with a solution of 3.1 g. of sodium bicarbonate in 300 ml. of water. The combined bicarbonate extracts were washed three times with ethyl acetate, layered with ethyl acetate, and acidified with 42% phosphoric acid. The aqueous phase was extracted twice more with ethyl acetate. The combined ethyl acetate extracts containing the new penicillin free acid were washed several times with water, dried with sodium sulfate, filtered, and treated with one equivalent of sodium 2-ethylhexanoate in 1-butanol (50% solution). The solid was collected by filtration and washed with ethyl acetate. The product was dissolved in wet 2-propanol and ethyl acetate added to the cloud point. After storage overnight in the cold the crystalline product was filtered and triturated with 2-propanol. The product was air dried and then dried in a vacuum oven at 60° for three hours giving 2.9 g. of sodium 6-(D-α-[3-(2-furoyl)ureido]-2-thienylacetamido)penicillanate; M.P. 192–194° dec. The infrared and nuclear magnetic resonance spectra were consistent with the desired compound.

The minimum inhibitory concentration (M.I.C.) of this product in mcg./ml. versus a strain of *Pseudomonas aeruginosa* was determined by overnight incubation at 37° C. in nutrient broth by serial two-fold tube dilution and found to be 16 mcg./ml.; in the same experiment the M.I.C. for sodium ampicillin was found to be 125 mcg./ml.

EXAMPLE 32

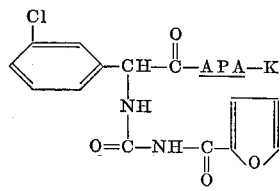

Potassium 6-{D-α-[3-(2-furoyl)ureido]-3-chlorophenylacetamido}penicillanate.—This product is prepared by substituting for the ampicillin in the procedure of Example 1 of an equimolar weight of 6-[D-(—)-α-amino-3-chlorophenylacetamido]penicillanic acid which is itself prepared by the methods known to the art and also, preferably, by the following procedures:

DL-α-amino-3-chlorophenylacetic acid.—A solution of 250 g. of m-chlorobenzaldehyde in 1.5 l. of 95% ethanol was added in one portion to a stirred solution of 123 g. of sodium cyanide, 515 g. of ammonium carbonate and 1.5 l. of water. The mixture was stirred at 50° for 120 hours. The cooled reaction mixture was acidified to pH 2 with concentrated hydrochloric acid and stirred one hour. The hydantoin was collected by filtration, washed with cold water, and sucked dry on the filter.

A mixture of the crude hydantoin obtained from two runs and 4 l. of 10% sodium hydroxide was refluxed for 18 hours. The solution was carbon treated and neutralized to pH 7 with acetic acid. The solid was collected by filtration, washed with water, and dried on the filter. A suspension of the product in 4 l. of water was acidified to pH 2 with concentrated hydrochloric acid. After stirring for 1.5 hours the insoluble material was removed by filtration and the filtrate adjusted to pH 7 with 10% sodium hydroxide. The precipitate was collected by filtration and dried in vacuo at 75° for 18 hours giving 311 g. of DL-α-amino-3-chlorophenylacetic acid; M.P. 266–269° dec.

DL-α-formamido-3-chlorophenylacetic acid.—To 100 g. of DL-α-amino-3-chlorophenylacetic acid was added 1.33 l. of formic acid. The reaction mixture was warmed to 50° and 483 ml. of acetic anhydride was added dropwise. After storage overnight the DL-α-formamido-3-chlorophenylacetic acid was collected by filtration and washed with water; yield 97 g.

D-(—)-α-amino-3-chlorophenylacetic acid.—α-Formamido-3-chlorophenylacetic acid (721 g.) and one kg. of dehydroabietylamine were combined in 4 l. of methanol. After storing in the cold for two hours the crystalline salt was collected by filtration. The product was recrystallized from methanol-water; yield 598 g., $[\alpha]_D^{25°} = -225°$ (C.=0.4 methanol). The salt was slurred in 2 l. of methanol and 2 liters of saturated sodium bicarbonate solution. The mixture was diluted with 2 l. of water, layered with methyl isobutyl ketone, and stirred vigorously. The aqueous phase was separated and acidified to pH 2 with conc. hydrochloric acid. The acid was collected by filtration and dried. The dried product was combined with 2 l. of 6 N hydrochloric acid and 750 ml. of methanol, the mixture heated for two hours, and filtered. The solution was adjusted to pH 5 with ammonium hydroxide. The solid was collected by filtration and washed with water and acetone giving 112 g. of D-(—)-α-amino-3-chlorophenylacetic acid; $[\alpha]_D^{23°} = -125°$ (C.=0.4 1 N HCl).

D-(—)-α-amino-3-chlorophenylacetyl chloride hydrochloride.—To a stirred suspension of 25 g. of D-(—)-α-amino-3-chlorophenylacetic acid in 375 ml. of methylene chloride at 2° was added 36.5 g. of phosphorus pentachloride. After stirring at 0 to 2° for one and one-half hours the product D-(—)-α-amino-3-chlorophenylacetyl chloride hydrochloride was collected by filtration, washed with methylene chloride and "Skellysolve B," and dried in vacuo to constant weight; yield 17.0 g.

6 - [D-(—)-α-amino-3-chlorophenylacetamido]penicillanic acid β-naphthalenesulfonate.—A suspension of 32.4 g. (0.150 mole) of 6-aminopenicillanic acid in 320 ml. of water was adjusted to pH 6.5 with 20% sodium hydroxide. The resulting clear solution was diluted with 1280 ml. of tetrahydrofuran and then adjusted to pH 3.5 with 6 N hydrochloric acid. The rapidly stirred mixture was cooled to −40° and 17.0 g. (0.0708 mole) of D-(—)-α-amino-3-chlorophenylacetyl chloride hydrochloride was added in one portion. The cooling bath was removed and the temperature of the reaction mixture brought to 0° during 40 minutes. The mixture was adjusted to pH 4.5 and the solid removed by filtration, the filter cake being washed with 300 ml. of water. The filtrate was adjusted to pH 7.0 with 20% sodium hydroxide and the tetrahydrofuran removed at reduced pressure on a rotary flash evaporator. The aqueous concentrate was filtered. The filtrate was adjusted to pH 2 with 6 N hydrochloric acid and extracted twice with methyl isobutyl ketone. The aqueous phase was adjusted to pH 4.5 with triethylamine, layered with 150 ml. of methyl isobutyl ketone and treated with 37.2 ml. of a 43% aqueous solution of β-naphthalenesulfonic acid. After stirring at 0 to 2° for two hours the crystalline product, 6-[-D-(—)-α-amino-3-chlorophenylacetamido]penicillanic acid β-naphthalenesulfonate, was collected by filtration, washed with water, and air dried; yield 11.2 g., M.P. 190–200° dec. with prior softening and darkening above about 175°. The infrared spectrum was consistent with 6-[D-(—)-α-amino-3-chlorophenylacetamido]penicillanic acid β-naphthalenesulfonate.

6 - [D-(—)-α-amino-3-chlorophenylacetamido]penicillanic acid.—A suspension of 27.3 g. of 6-[D-(—)-α-amino - 3 - chlorophenylacetamido]penicillanic acid β-naphthalenesulfonate in 500 ml. of water was adjusted to pH 7.5 with triethylamine and stirred for one hour. The mixture was then slowly adjusted to pH 4.5 with 6 N hydrochloric acid and stirred for two hours at 0°. The crystalline product was collected by filtration, washed with water, air dried, and then dried in vacuo over phosphorus pentoxide; yield 12.3 g. A suspension of the product (12 g.) in one l. of water was adjusted to pH 1.5–1.6 with 6 N hydrochloric acid. The mixture was filtered twice the second time through diatomaceous earth ("Super Cel") to remove insoluble material. The clear filtrate was adjusted to pH 4.3 with 20% sodium hydroxide and stirred at 2° for two hours. The crystalline 6-[D-(—)-

α-amino-3-chlorophenylacetamido]penicillanic acid was collected by filtration, washed with a small amount of water, and dried in vacuo over phosphorus pentoxide; yield 7.0 g., M.P. 203–204° dec., with prior darkening, $[\alpha]_D = +261.9°$ (C. 0.5 0.1 N HCl).

*Analysis.*—Calcd. for $C_{16}H_{18}ClN_3O_4S$: C, 50.06; H, 4.73; N, 10.92. Found: C, 50.00; H, 4.76; N, 10.5.

The compound is also named 6-[R-α-amino-3-chlorophenylacetamido]penicillanic acid in the nomenclature of Cahn, Ingold and Prelog, Experientia, XII(3), 81–94 (Mar. 15, 1956); all of the D penicillins in this specification are R penicillins in the system of Cahn et al.

EXAMPLE 33

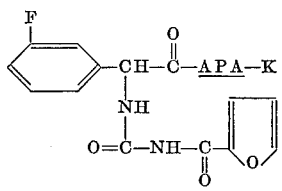

Potassium 6-{D-α-[3-(2-furoyl)ureido]-3-fluorophenylacetamido}penicillanate.—This product is prepared by substituting for the ampicillin in the procedure of Example 1 an equimolar weight of 6-[D-(—)-α-amino-3-fluorophenylacetamido]penicillanic acid which is itself prepared by the methods known to the art and also, preferably, by the following procedures:

DL-α-amino-3-fluorophenylacetic acid.—To a stirred solution of 24.5 g. of sodium cyanide, 29.5 g. of ammonium chloride, 25 ml. of ammonium hydroxide and 100 ml. of water at room temperature was added a solution of 62.0 g. of m-fluorobenzaldehyde in 200 ml. of methanol. The mixture was stirred at 38° for two hours. The methanol was stripped off at reduced pressure. The residue was extracted with two by 200-ml. portions of ethyl acetate. The combined extracts were washed with water. To the ethyl acetate phase was added dropwise with vigorous stirring 50 ml. of 6 N hydrochloric acid at room temperature. The solution was put under vacuum (water aspirator) and 250 ml. or 6 N hydrochloric acid added dropwise. The mixture was refluxed for 2.5 hours, stirred for 13 hours, and adjusted to pH 4.8 with concentrated ammonium hydroxide while cooling in an ice bath. The aqueous phase was decanted and the gummy precipitate triturated with water and ethyl acetate. The product DL-α-amino-3-fluorophenylacetic acid was collected by filtration and dried in vacuo over phosphorus pentoxide; yield 8.6 g., M.P. 200–203° (sublimation). A second crop of product separated from the filtrates; yield 2.0 g., M.P. 245–250° (sublimation).

DL-α-formamido-3-fluorophenylacetic acid.—A partial solution of 35 g. of DL-α-amino-3-fluorophenylacetic acid in 356 ml. of 88% formic acid was heated to 50° and 119 ml. of acetic anhydride added dropwise. The mixture was stirred for 17 hours at 50–60° and cooled. The product, DL-α-formamido-3-fluorophenylacetic acid, was collected by filtration and dried in vacuo; yield 38.5 g., M.P. 207–209° dec.

D-α-formamido-3-fluorophenylacetic acid.—To a solution of 20 g. of DL-α-formamido-3-fluorophenylacetic acid in 4 l. of pH 7 phosphate buffer was added 3.0 g. of hog kidney D-amino acid oxidase (Nutritional Biochemicals Corp.). The mixture was stored at 37° for 19.5 hours, adjusted to pH 5.0 with acetic acid, 5 g. of carbon added, heated to 60° for one half hour, and filtered. The filtrate was adjusted to pH 2 with 40% phosphoric acid and extracted with ethyl acetate. The ethyl acetate extract was washed with water and stripped to dryness giving 10.0 g. of product; M.P. 190–192°, $[\alpha]_D^{24°} = -161.0°$ (C. 1.0 methanol). The product was again treated with hog kidney D-amino acid oxidase (1 g.) in 500 ml. of pH 7 phosphate buffer and the product worked up as above. There was obtained after recrystallization of the product from methanol 5.7 g. of D-α-formamido-3-fluorophenylacetic acid; $[\alpha]_D^{24°} = -178.0°$ (C. 1.0 methanol).

D-α-amino-3-fluorophenylacetic acid.—A suspension of D-α-formamido-3-fluorophenylacetic acid (9.48 g.) in 100 mol. of 6 N hydrochloric acid was refluxed for one-half hour. The reaction mixture was cooled in an ice bath, filtered, and adjusted to pH 3.8 with concentrated ammonium hydroxide. After stirring for 10 minutes the product, D-α-amino-3-fluorophenylacetic acid, was collected by filtration and dried in vacuo over phosphorus pentoxide; yield 6.63 g., $[\alpha]_D^{24°} = -110°$ (C. 1.0 1 N hydrochloric acid), M.P. 249–250°.

D-α-(carbobenzoxyamino)-3-fluorophenylacetic acid.—To D-α-amino-3-fluorophenylacetic acid (4.9 g.) partially dissolved in 300 ml. of water at pH 10 (10% sodium hydroxide used) at 0° was added 11.2 g. of carbobenzoxy chloride. The vigorously stirred mixture was maintained at pH 10 by the addition of 10% sodium hydroxide. A white gum formed. After one hour the reaction mixture was extracted once with ether. The aqueous phase was layered with ethyl acetate and acidified to pH 3 with 6 N hydrochloric acid. Three additional extractions with ethyl acetate were made. The combined ethyl acetate extracts were washed with water, dried with magnesium sulfate, the solvent stripped off at reduced pressure, the resulting residual oil solidified with "Skellysolve B", collected by filtration, and dried in vacuo over phosphorus pentoxide: yield 4.3 g. of D-α-(carbobenzoxyamino)-3-fluorophenylacetic acid, M.P. 117–119°, $[\alpha]_D^{24°} = -80°$ (C. 1.0 methanol).

6 - (D - α - amino - 3 - fluorophenylacetamido)penicillanic acid.—Ethyl chloroformate (1.53 g.) was added to a solution of 4.2 g. of D-α-(carbobenzoxyamino)-3-fluorophenylacetic acid and 1.94 ml. of triethylamine in 70 ml. of tetrahydrofuran at −5°. After stirring for 10 minutes a solution of 3.03 g. of 6-amino-penicillanic acid and 1.94 ml. of triethylamine in 70 ml. of 50% aqueous tetrahydrofuran was added all at once. The mixture was stirred for one-half hour at 0° and then the ice bath was removed for one hour. The reaction mixture was diluted with 250° ml. of water and the tetrahydrofuran distilled off at reduced pressure. To the reside was added 350 ml. of ethyl acetate and 7 ml. of 42% phosphoric acid. Two additional extractions with 250-ml. portions of ethyl acetate were made. The combined ethyl acetate extracts were washed with water, dried with magnesium sulfate, and the solvent distilled off at reduced pressure. The residue was solidified with "Skeyylsolve B," collected by filtration, and dried in vacuo over phosphorus pentoxide giving 4.8 of 6 - [D - α - (carbobenzoxyamino) - 3 - fluorophenylacetamido]-penicillanic acid.

The carbobenzoxy penicillin was dissolved in 50 ml. of 3% sodium bicarbonate plus 50 ml. of dioxane and hydrogenated in the presence of 4.8 g. of 30% palladium on a diatomaceous earth for 25 minutes on a low pressure Paar hydrogenation apparatus. Phosphoric acid (42%) was added to the hydrogenation mixture to coagulate the catalyst. The mixture was filtered, methyl isobutyl ketone was added to the filtrate, and the mixture again filtered removing all catalyst. The aqueous phase was separated, adjusted to pH 4.5 with 10% sodium hydroxide, and the dioxane distilled off at reduced pressure. The concentrate was readjusted to pH 4.5, 2-propanol added, and concentrated giving a gelatinous precipitate which was collected by filtration and washed with ether; yield 13.8 g. The crude product was stirred with 5 ml. of water for 30 minutes, collected by filtration, was dried in vacuo over phosphorus pentoxide; yield 700 mg. The infrared and nuclear magnetic resonance spectra were consistent with 6-(D-α-amino-3-fluorophenylacetamido)penicillanic acid.

EXAMPLE 34

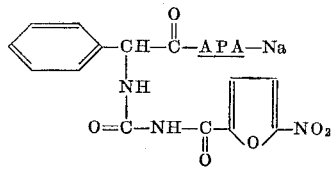

Sodium 6-(D-α-[3-(5-nitro-2-furoyl)ureido]phenyl-acetamido)penicillanate (A) 5-nitro-2-furoyl isocyanate.—Oxalyl chloride (17.4 ml.) was added to a stirred suspension of 31.9 g. of 5-nitro-2-furamide (Beil., 18, 288) in 200 ml. of 1,2-dichloroethane. Precautions to exclude moisture were taken throughout the experiment. The mixture was refluxed for 18 hours. The solvent was distilled off leaving 30 g. of 5-nitro-2-furoyl isocyanate as an oil which quickly crystallized; M.P. 53–55°. The infrared spectrum (methylene chloride) was consistent for the desired product showing characteristic absorption at 2250 cm.$^{-1}$ (isocyanate).

(B) Reaction with ampicillin.—To the methylene chloride solution of ampicillin triethylammonium salt prepared from 22.7 g. of ampicillin trihydrate, 11.8 ml. of triethylamine, 30 g. of powdered molecular sieves (Linde 4A) and 300 ml. of methylene chloride was added 11.3 g. of 5-nitro-2-furoyl isocyanate. The reaction mixture was stirred for one hour at room temperature. Water (300 ml.) was added and the methylene chloride distilled off at reduced pressure. The aqueous residue was layered with ethyl acetate and acidified with 42% phosphoric acid. Two more extractions of the aqueous phase were made with ethyl acetate. The combined ethyl acetate extracts were washed twice with water and then extracted three times with a solution of 4.7 g. of sodium bicarbonate in 300 ml. of water. The combined bicarbonate extracts were washed twice with ethyl acetate, acidified with 42% phosphoric acid and extracted three times with ethyl acetate. The combined ethyl acetate extracts containing the penicillin free acid were washed three times with water, dried with sodium sulfate, filtered and treated with 18.6 g. of a 50% solution of sodium 2-ethylhexanoate in 1-butanol giving at first an oil which crystallized. The product was filtered, washed with ethyl acetate, and air dried; yield 22 g. The product was slurried with anhydrous ether, filtered, and dissolved in water. The aqueous solution was layered with ethyl acetate and acidified with 42% phosphoric acid. Two more extractions were made with ethyl acetate. The combined ethyl acetate extracts were washed several times with water and then stirred for 15 minutes with 11.0 g. of decolorizing carbon and anhydrous sodium sulfate. The mixture was filtered and the filtrate treated with an equivalent amount of a 50% solution of sodium 2-ethyl hexanoate in 1-butanol. The crystalline product, sodium 6-(D-α-[3-(5-nitro-2-furoyl)ureido]phenylacetamido)penicillanate, was filtered, washed with ethyl acetate and dried in vacuo at 60° for three hours; yield 14.2 g., M.P. 215–220° dec. with prior darkening. The infrared and nuclear magnetic resonance spectra were consistent with sodium 6-(D-α-[3-(5-nitro-2-furoyl)ureido]phenylacetamido)penicillanate.

The minimum inhibitory concentration (M.I.C.) of this product in mcg./ml. versus a strain of Pseudomonas aeruginosa was determined by overnight incubation at 37° C. in nutrient broth by serial two-fold tube dilution and found to be 63 mcg./ml.; in the same experiment the M.I.C. for sodium ampicillin was found to be 125 mcg./ml.

EXAMPLE 35

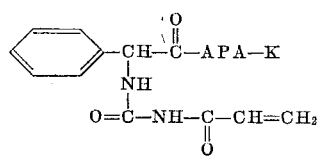

Potassium 6-[D-α-(3-acryloylureido)phenylacetamido]-penicillanate.—To an ice cooled methylene chloride solution of ampicillin triethylammonium salt prepared from 20.2 g. of ampicillin trihydrate, 10.5 ml. of triethylamine, 45 g. of powdered molecular sieves and 600 ml. methylene chloride was added 100 ml. (approximately 6 g. of acryloyl isocyanate) of an approximately 6–8% solution of acryloyl isocyanate in n-pentane [prepared using n-pentane as solvent by the procedure of Lieser, Kemmner, Ber., 84, 4 (1951)]. After 15 minutes the ice bath was removed and stirring continued for one hour. Water (300 ml.) was added to the reaction mixture and the methylene chloride distilled off at reduced pressure. The aqueous concentrate was layered with ethyl acetate and acidified with 42% phosphoric acid. Two additional extractions of the aqueous phase were made with ethyl acetate. The combined ethyl acetate extracts were washed three times with water, dried over sodium sulfate, filtered, and treated with 19 ml. (0.05 mole) of potassium 2-ethylhexanoate in 1-butanol giving a crystalline solid. The product, potassium 6-[D-α-(3-acryloylureido)phenylacetamido]-penicillanate, was collected by filtration and washed on the filter with ethyl acetate and sparingly with acetone; yield 19.2 g., M.P. 230–231° dec. The infrared and nuclear magnetic resonance spectra were consistent with potassium 6-[D-α-(3-acryloylureido)phenylacetamido]penicillanate.

The minimum inhibitory concentration (M.I.C.) of this product in mcg./ml. versus a strain of Pseudomonas aeruginosa was determined by overnight incubation at 37° C. in nutrient broth by serial two-fold tube dilution and found to be 8 mcg./ml.; in the same experiment the M.I.C. for sodium ampicillin was found to be 125 mcg./ml.

The M.I.C.'s in mcg./ml. against five strains of Ps. aeruginosa for sodium ampicillin, disodium carbenicillin ("Pyopen") and some of the compounds described in the above examples as determined on nutrient agar plates incubated 24 hours at 37° C. were as follows:

| Strain Number | Ampicillin | Carbenicillin | Compound of Example No. | | | | | |
|---|---|---|---|---|---|---|---|---|
| | | | 5 | 10 | 11 | 1 | 14 | 2 | 4 |
| A-9843 | 500 | 32 | 4 | 4 | 2 | 4 | 8 | 16 | 8 |
| A-9923 | 500 | 63 | 4 | 8 | 2 | 4 | 4 | 16 | 16 |
| A-9930 | 16 | 16 | 2 | 4 | 2 | 4 | 2 | 16 | 4 |
| A-15150 | >500 | 63 | 4 | 8 | 2 | 4 | 8 | 32 | 63 |
| A-15194 | 500 | 250 | 32 | 32 | 16 | 32 | 32 | 63 | 63 |

In an experiment in which the M.I.C. versus a strain of Ps. aeruginosa for sodium ampicillin was 125 mcg./ml., the M.I.C. of sodium D-α-ureidobenzylpenicillin was 63 mcg./ml.

I claim:
1. The compounds of the formula

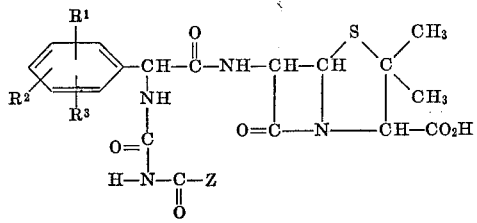

and

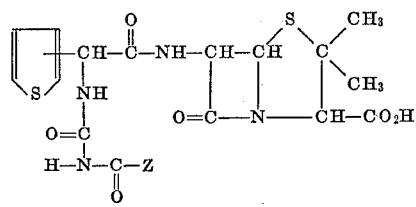

wherein $R^1$, $R^2$ and $R^3$ each is hydrogen, nitro, (lower)alkylamino, di(lower)alkylamino, (lower)alkanoylamino, amino, hydroxy, (lower)alkanoyloxy, (lower)akyl (comprising straight and branched chain saturated aliphatic groups having from 1 to 6 carbon atoms inclusive), (lower)alkoxy, sulfamyl, chloro, iodo, bromo, fluoro or trifluoromethyl; Z is (lower)alkyl, cycloalkyl having 4, 5, 6 or 7 carbon atoms, monohalo(lower)alkyl, dichloromethyl, trichloromethyl, (lower)alkenyl of 2 to 6 carbon atoms,

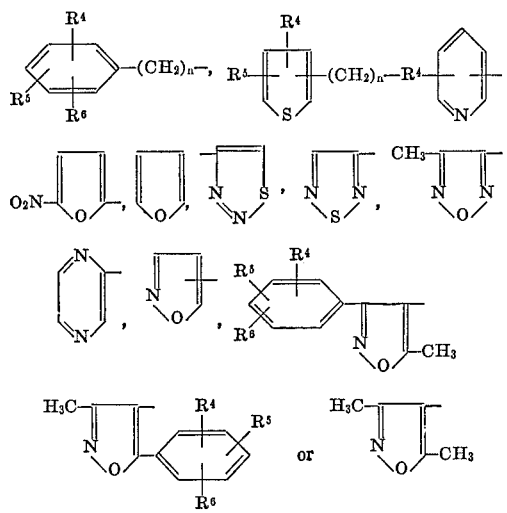

wherein $n$ is an integer from 0 to 3 inclusive and $R^4$, $R^5$ and $R^6$ each is hydrogen, nitro, di(lower)alkylamino, (lower)alkanoylamino, (lower)alkanoyloxy, (lower)alkyl (comprising straight and branched chain saturated aliphatic groups having from 1 to 6 carbon atoms inclusive), (lower)alkoxy, sulfamyl chloro, iodo, bromo, fluoro or trifluoromethyl; and their nontoxic, pharmaceutically acceptable salts.

2. The compounds of claim 1 having the D(—) configuration.

3. The compounds of claim 2 wherein $R^1$, $R^2$ and $R^3$ are each hydrogen, hydroxy or amino.

4. The compounds of claim 2 wherein $R^1$, $R^2$ and $R^3$ are each hydrogen.

5. The compounds of claim 2 wherein $R^1$, $R^2$, $R^3$ and, when present, $R^4$, $R^5$ and $R^6$ are each hydrogen.

6. The compounds of claim 2 wherein $R^1$, $R^2$ and $R^3$ are each hydrogen, hydroxy or amino and Z is (lower)alkyl, chloromethyl, dichloromethyl, trichloromethyl or (lower)alkenyl.

7. The compounds of claim 2 wherein $R^1$, $R^2$ and $R^3$ are each hydrogen and Z is (lower)alkyl.

8. The compounds of claim 2 wherein $R^1$, $R^2$, $R^3$ and, when present, $R^4$, $R^5$ and $R^6$ are each hydrogen, $n$ is zero and Z is one of the specified aromatic radicals.

9. The compounds of claim 2 wherein $R^1$, $R^2$ and $R^3$ are each hydrogen, hydroxy or amino and Z is

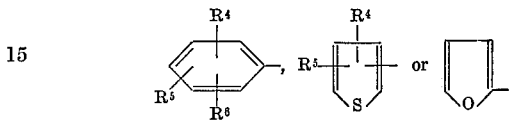

10. The compounds of claim 2 wherein $R^1$, $R^2$ and $R^3$ are each hydrogen and Z is phenyl, 2-thienyl, 3-thienyl, 2-furyl or 5-nitro-2-furyl.

11. The compound of claim 1 known as 6-[D-α-(3-benzoyluredio)phenylacetamido]penicillanic acid and its nontoxic, pharmaceutically acceptable salts.

12. The compound of claim 1 known as 6-{D-α-[3-(2'-furoyl)ureido]phenylacetamido}penicillanic acid and its nontoxic, pharmaceutically acceptable salts.

13. The compound of claim 1 known as 6-{D-α-[3-(2'-thenoyl)ureido]phenylacetamido}penicillanic acid and its nontoxic, pharmaceutically acceptable salts.

14. The compound of claim 1 known as 6-{D-α-[3-(3'-thenoyl)ureido]phenylacetamido}penicillanic acid and its nontoxic, pharmaceutically acceptable salts.

15. The compound of claim 1 known as 6-{D-α-[3-(5'-nitro-2' - furoyl)ureido]phenylacetamido}penicillanic acid and its nontoxic, pharmaceutically acceptable salts.

16. The compound of claim 1 known as 6-[D-α-(3-benzoylureido)-2-thienylacetamido]penicillanic acid and its nontoxic, pharmaceutically acceptable salts.

17. The compound of claim 1 known as 6-{D-α-[3-(2'-furoyl)ureido]-2-thienylacetamido}penicillanic acid and its nontoxic, pharmaceutically acceptable salts.

18. The compound of claim 1 known as 6-{D-α-[3-(2'-thenoyl)ureido]-2-thienylacetamido}penicillanic acid and its nontoxic, pharmaceutically acceptable salts.

19. The compound of claim 1 known as 6-{D-α-[3-(3'-thenoyl)ureido]-2-thienylacetamido}penicillanic acid and its nontoxic, pharmaceutically acceptable salts.

20. The compound of claim 1 known as 6-{D-α-[3-(5'-nitro-2'-furoyl)ureido] - 2 - thienylacetamido}penicillanic acid and its nontoxic, pharmaceutically acceptable salts.

21. The compound of claim 1 known as 6-[D-α-(3-benzoylureido)-3-thienylacetamido]penicillanic acid and its nontoxic, pharmaceutically acceptable salts.

22. The compound of claim 1 known as 6-{D-α-[3-(2'-furoyl)ureido]-3-thienylacetamido}penicillanic acid and its nontoxic, pharmaceutically acceptable salts.

23. The compound of claim 1 known as 6-{D-α-[3-(2'-theonyl)ureido]-3-thienylacetamido}penicillanic acid and its nontoxic, pharmaceutically acceptable salts.

24. The compound of claim 1 known as 6-{D-α-[3-(3'-thenoyl)ureido]-3-thienylacetamido}penicillanic acid and its nontoxic, pharmaceutically acceptable salts.

25. The compound of claim 1 known as 6-{D-α-[3-(5'-nitro-2'-furoyl)ureido] - 3 - thienylacetamido}penicillanic acid and its nontoxic, pharmaceutically acceptable salts.

26. 6-{D-α-[3 - (2' - furoyl)ureido]phenylacetamido}-penicillanic acid.

27. 6-{D-α-[3-(2'-furoyl)ureido]-2 - thienylacetamido}-penicillanic acid.

28. 6-{D-α-[3-(2'-furoyl)ureido] - 3 - thienylacetamido}-penicillanic acid.

29. Sodium 6-{D-α-[3-(2'-furoyl)ureido]phenylacetamido}-penicillanate.

30. Sodium 6-{-Dα-[3-(2'-furoyl)ureido]-2-thienylacetamido}-penicillanate.

31. Sodium 6-{D-α-[3-(2'-furoyl)ureido]-3-thienylacetamido}-penicillanate.

32. Potassium 6-{D-α-[3-(2'-furoyl)ureido]phenylacetamido}-penicillanate.

33. Potassium 6-{D-α-[3-(2'-furoyl)ureido]-2-thienylacetamido}-penicillanate.

34. Potassium 6-{D-α-[3-(2'-furoyl)ureido]-3-thienylacetamido}-penicillanate.

References Cited

UNITED STATES PATENTS 3,308,023  3/1967  Russell _____ 260—239.1

NICHOLAS S. RIZZO, Primary Examiner

U.S. Cl. X.R.

260—999